(12) United States Patent
Lucamarini et al.

(10) Patent No.: US 10,951,324 B2
(45) Date of Patent: Mar. 16, 2021

(54) TRANSMITTER FOR A QUANTUM COMMUNICATION SYSTEM, A QUANTUM COMMUNICATION SYSTEM AND A METHOD OF GENERATING INTENSITY MODULATED PHOTON PULSES

(71) Applicant: Kabushiki Kaisha Toshiba, Minato-ku (JP)

(72) Inventors: Marco Lucamarini, Cambridge (GB); Zhiliang Yuan, Cambridge (GB); Taofiq Paraiso, Cambridge (GB); James Dynes, Cambridge (GB); Andrew Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/282,578

(22) Filed: Feb. 22, 2019

(65) Prior Publication Data

US 2019/0260478 A1 Aug. 22, 2019

(30) Foreign Application Priority Data

Feb. 22, 2018 (GB) ..................... 1802891

(51) Int. Cl.
*H04B 10/70* (2013.01)
*H04B 10/54* (2013.01)

(52) U.S. Cl.
CPC ............. *H04B 10/70* (2013.01); *H04B 10/54* (2013.01)

(58) Field of Classification Search
CPC ....... H04B 10/54; H04B 10/70; H04B 10/548
(Continued)

(56) References Cited

U.S. PATENT DOCUMENTS 8,050,566 B2 * 11/2011 Luo ..................... H04J 14/0246
398/89
8,331,797 B2 * 12/2012 Han ..................... H04L 9/0858
398/183
(Continued)

FOREIGN PATENT DOCUMENTS

EP        1 848 128 A1    10/2007
GB        2 404 103 A      1/2005
(Continued)

OTHER PUBLICATIONS

Uppu et al; Quantum optics lossy asymmetric beam splitters; Optics Express vol. 24, No. 15, Jul. 2016; pp. 16440-16449. (Year: 2016).*
(Continued)

*Primary Examiner* — Amritbir K Sandhu
(74) *Attorney, Agent, or Firm* — Oblon, McClelland, Maier & Neustadt, L.L.P.

(57) ABSTRACT

A transmitter for a quantum communication system, comprising:
a photon source unit comprising a photon source;
a first intensity modulator, configured to receive an input light pulse from the photon source unit, the first intensity modulator comprising:
a first element, configured to split the input light pulse into two components;
a phase modulator, configured to apply a phase shift between the two components; and
a second element, configured to interfere the two components;
wherein at least one of the first element and the second element is asymmetric.

18 Claims, 18 Drawing Sheets

(58) Field of Classification Search
USPC .................................................. 398/118–131
See application file for complete search history.

(56) References Cited

U.S. PATENT DOCUMENTS

| | | | | |
|---|---|---|---|---|
| 9,500,930 | B1* | 11/2016 | Soh | H04L 9/0852 |
| 2003/0169880 | A1* | 9/2003 | Nambu | H04L 9/0852 |
| | | | | 380/256 |
| 2004/0005056 | A1* | 1/2004 | Nishioka | H04B 10/5057 |
| | | | | 380/256 |
| 2007/0064945 | A1* | 3/2007 | Yuan | H04B 10/70 |
| | | | | 380/263 |
| 2009/0268276 | A1* | 10/2009 | Lee | H04B 10/70 |
| | | | | 359/330 |
| 2010/0195831 | A1* | 8/2010 | Tanaka | H04L 9/0858 |
| | | | | 380/256 |
| 2011/0075839 | A1* | 3/2011 | Noh | H04L 9/0858 |
| | | | | 380/44 |
| 2014/0105598 | A1* | 4/2014 | Lucamarini | H04B 10/07955 |
| | | | | 398/38 |
| 2015/0055961 | A1* | 2/2015 | Meyers | H04B 10/70 |
| | | | | 398/140 |
| 2015/0331672 | A1* | 11/2015 | Yuan | H01S 5/065 |
| | | | | 359/107 |
| 2015/0333475 | A1* | 11/2015 | Blumenthal | H01S 5/026 |
| | | | | 372/20 |
| 2015/0372768 | A1* | 12/2015 | Dynes | H04B 10/70 |
| | | | | 398/188 |
| 2016/0047643 | A1* | 2/2016 | Yuan | H01S 5/4006 |
| | | | | 398/25 |
| 2017/0155499 | A1* | 6/2017 | Han | H04L 9/0852 |
| 2017/0237505 | A1* | 8/2017 | Lucamarini | H04B 10/5161 |
| | | | | 398/185 |
| 2018/0062755 | A1* | 3/2018 | Simard | G02F 1/2257 |
| 2018/0062838 | A1* | 3/2018 | Godfrey | H04B 10/70 |
| 2018/0180401 | A1* | 6/2018 | Roztocki | G01J 3/45 |
| 2019/0260478 | A1* | 8/2019 | Lucamarini | H04B 10/548 |

FOREIGN PATENT DOCUMENTS

| | | |
|---|---|---|
| GB | 2525399 B | 5/2016 |
| GB | 2536248 A | 9/2016 |
| GB | 2550264 A | 11/2017 |
| JP | 2006-346354 A | 12/2006 |
| JP | 2007-286551 A | 11/2007 |
| JP | 2012-63701 A | 3/2012 |
| JP | 2013-160989 | 8/2013 |
| JP | 2015-094812 A | 5/2015 |
| JP | 2015-122675 | 7/2015 |
| JP | 2016-042694 A | 3/2016 |
| WO | WO 2003/003104 A1 | 1/2003 |
| WO | WO 2016/149749 A1 | 9/2016 |

OTHER PUBLICATIONS

Huang et al; Long distance continuous-variable quantum key distribution by controlling excess noise; Nature.com scientific reports; Jan. 2016; pp. 1-9. (Year: 2016).*

Marie et al ; Self coherent phase reference sharing for continuous-variable quantum key distribution; Aug. 2016; pp. 1-22. (Year: 2016).*

British Search Report dated Aug. 21, 2018 in British Application 1802891.0, filed on Feb. 22, 2018.

Dixon, A., et al. "Gigahertz decoy quantum key distribution with 1 Mbit / s secure key rate", Optics Express, vol. 16, No. 23, 2008, 14 pages.

Office Action dated Feb. 12, 2020 in corresponding Japanese Patent Application No. 2019-028609 with English Translation.

"Delay Line Interferometers", Datasheet, http://kylia.com/kylia/, Feb. 3, 2015, 17 pages.

Office Action dated Jun. 9, 2020 in corresponding Japanese Patent Application No. 2019-028609 (with English Translation), 11 pages.

* cited by examiner

Decoy state MDI-QKD

TRANSMITTER FOR A QUANTUM COMMUNICATION SYSTEM, A QUANTUM COMMUNICATION SYSTEM AND A METHOD OF GENERATING INTENSITY MODULATED PHOTON PULSES

CROSS-REFERENCE TO RELATED APPLICATION

This application is based upon and claims the benefit of priority from prior United Kingdom Application number 1802891.0 filed on Feb. 22, 2018, the entire contents of which are incorporated herein by reference.

FIELD

The present disclosure relates to a transmitter for a quantum communication system, a quantum communication system and a method of generating intensity modulated photon pulses.

BACKGROUND

In a quantum communication system, information is sent between a transmitter and a receiver by encoded single quanta, such as single photons. Each photon carries one bit of information encoded upon a property of the photon, such as its polarization, phase or energy/time. The photon may carry more than one bit of information, for example, by using properties such as angular momentum.

Quantum key distribution (QKD) is a technique which results in the sharing of cryptographic keys between parties: for example between a transmitter (often referred to as "Alice") and a receiver (often referred to as "Bob"), or between two transmitters (in a measurement device independent QKD protocol for example). The technique provides a test of whether any part of the key can be known to an unauthorised eavesdropper, often referred to as "Eve". In many forms of quantum key distribution, two or more non-orthogonal bases are used to encode the bit values. The laws of quantum mechanics dictate that measurement of the photons by Eve without prior knowledge of the encoding basis of each causes an unavoidable change to the state of some of the photons. These changes to the states of the photons will cause errors in the bit values. By comparing a part of their common bit string, the parties can thus determine if Eve has gained information.

Various protocols can be used for QKD. Many protocols, for example those based on decoy states, use multiple intensity levels. There is a continuing need to improve the security and stability of such systems.

BRIEF DESCRIPTION OF THE DRAWINGS

Systems and methods in accordance with non-limiting arrangements will now be described with reference to the accompanying figures in which.

DETAILED DESCRIPTION

Figure 1B:
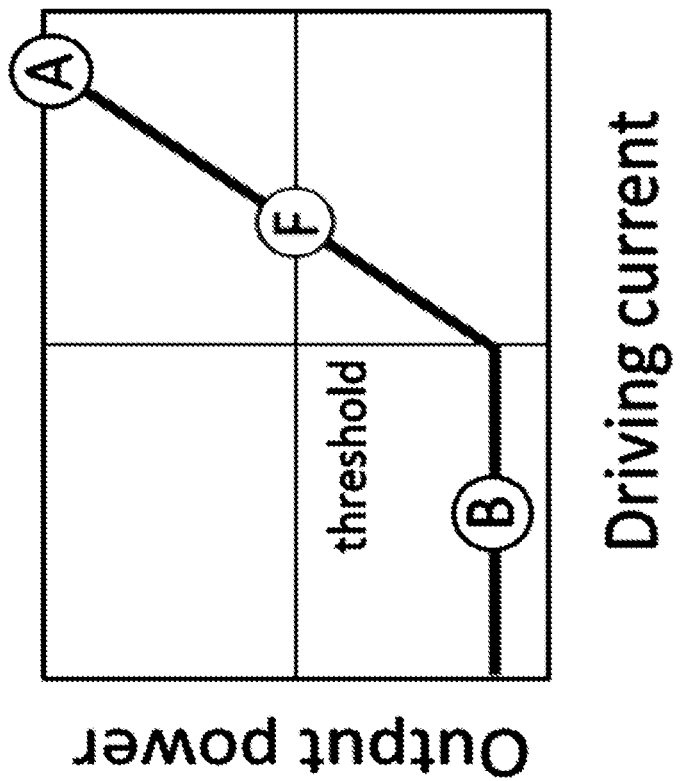
FIGS. 1(a) and 1(b) show graphs of output laser power with the laser driving current.

A transmitter for a quantum communication system is provided, comprising:
a photon source unit comprising a photon source;
a first intensity modulator, configured to receive an input light pulse from the photon source unit, the first intensity modulator comprising:
  a first element, configured to split the input light pulse into two components;
  a phase modulator, configured to apply a phase shift between the two components; and
  a second element, configured to interfere the two components;
wherein at least one of the first element and the second element is asymmetric.

The first element may be asymmetric and the second element symmetric, or the first element symmetric and the second element asymmetric, or the first element asymmetric and the second element with the same amount of asymmetry, or the first element asymmetric and the second element with a different amount of asymmetry for example.

The term "asymmetric" is used throughout the specification to refer to an element configured to output a first component and a second component (or a first intensity and a second intensity) when a light pulse is input, the intensities of the first component and the second component being unequal (i.e. the first intensity and the second intensity being different). Examples of asymmetric elements include a beam splitter (other than a 50:50 beam splitter); a polarisation controller and a polarizing beam splitter; and a polarisation controller and an interface between a polarization maintaining fibre and a single mode fibre.

One of the first element and second element may be partially asymmetric and the other of the first element and second element may be symmetric or partially asymmetric. The term "fully asymmetric" is used throughout the specification to describe an element in which the intensity of one of the first component and the second component is zero. The term "partially asymmetric" is used throughout the specification to describe an element in which the intensities of the first component and the second component are unequal and non-zero (i.e. the first intensity and the second intensity being different and non-zero).

Asymmetric elements have a splitting ratio of less than 1, where the splitting ratio is the ratio of the intensity of the first component to the intensity of the second component, i.e. $I_1/I_2$. The splitting ratio is thus a ratio of a first intensity to a second intensity outputted from the element if a single intensity is inputted. An asymmetric component may have a ratio (or percentage of the output light) between transmitted light (coefficient T) and reflected light (coefficient 'r') (or light emerging from port 1 and port 2 for example) of less than 1. A "fully asymmetric" component has a splitting ratio of 0. A "partially asymmetric" component has a splitting ratio of less than 1 and greater than 0. At least one of the first component and the second component may have a splitting ratio of less than or equal to 0.99 and greater than 0. At least one of the first component and the second component may have a splitting ratio of less than or equal to 0.9 and greater than 0.

An asymmetric element is configured to output a first optical mode (component) and a second optical mode (component) when a single optical mode is input, the intensities of the first mode and the second mode being unequal. The modes may be spatial modes (e.g. in different fibres) or polarization modes for example. In more detail, each pulse has one or more degrees of freedom, i.e. "labels" which distinguish light pulses, including for example polarization, spatial path, wavelength, and time. For every degree of freedom there are one or more corresponding modes. For example, for the polarization through a polarising beam splitter there is a vertical mode and a horizontal mode. For wavelength, there may be a mode with wavelength $\lambda_1$ and another with wavelength $\lambda_2$.

The contrast of the light output from the intensity modulator depends on the asymmetry.

The photon source unit may be configured to emit light pulses having a first intensity and a second intensity, the second intensity being lower than the first intensity. The second intensity may correspond to a vacuum state.

The phase modulator may comprise a first setting, corresponding to one of destructive interference or constructive interference and a second setting, corresponding to the other of destructive or constructive interference, and wherein the first intensity modulator outputs light pulses having three or more different intensities, dependent on selection between the first and second setting of the phase modulator and the first and second intensity of the photon source unit.

The phase modulator may comprise a first setting, corresponding to one of destructive interference or constructive interference at the second element, wherein when the input light pulse has the first intensity, an output light pulse at a first output of the second element has a third intensity when the phase modulator has the first setting, the third intensity being less than the first intensity and greater than the second intensity. The phase modulator may further comprise a second setting, corresponding to the other one of destructive interference or constructive interference at the second element, and wherein when the input light pulse has the first intensity, an output light pulse at the first output of the second element has a fourth intensity when the phase modulator has the second setting, wherein the fourth intensity is greater than the third intensity and less than or equal to the first intensity.

The quantum transmitter may be configured to implement decoy state quantum communication. The quantum transmitter may be configured to implement decoy state measurement device independent quantum communication. The transmitter may be a decoy-state QKD transmitter, comprising a fixed low extinction ratio intensity modulator or a variable extinction ratio intensity modulator coupled in series with one or more other elements. The transmitter may be a decoy-state MDI-QKD transmitter, comprising a fixed low extinction ratio intensity modulator or a variable extinction ratio intensity modulator coupled in series with one or more other elements. The extinction ratio ER is defined as ER=(max−min)/(max+min), where max is the maximum intensity output through one port and min is the minimum intensity output through the port.

The transmitter may be configured for stable high-speed generation of optical pulses with three or more different intensities, including at least one low-contrast pair of intensities. There may be a fixed low extinction ratio or a variable extinction ratio between the intensity levels. For example, the second intensity is in the range ¼th to ¹⁄₂₀th of the first intensity. The transmitter may be configured for generation of optical pulses with two or more different intensities. For example, two states may be used for a decoy state protocol, for example u=0.5 and v=0.1 (i.e. without the vacuum state).

The first intensity modulator may have an extinction ratio of less than or equal to 0.9. The first intensity modulator may have a variable extinction ratio.

The first element and/or the second element may comprise an asymmetric beam splitter. The first element and/or the second element may comprise a tunable ratio splitter. The tunable ratio splitter may comprise a first symmetric beam splitter and a second symmetric beam splitter, wherein one output of the first symmetric beam splitter is coupled to one input of the second symmetric beam splitter forming a first arm, and the other output of the first symmetric beam splitter is coupled to the other input of the second symmetric beam splitter forming a second arm, wherein at least one of the first arm and the second arm comprises a phase modulator, configured to tune the splitting ratio of the tunable ratio splitter.

The intensity modulator can be implemented using a Mach-Zehnder interferometer (MZI) comprising one or more asymmetric beam splitters, for example one asymmetric beam splitter at the MZI output and one 50:50 beam splitter at the MZI input, one asymmetric beam splitter at the MZI output and one asymmetric beam splitter at the MZI input, or one variable-ratio beam splitter at the MZI input and one variable-ratio beam splitter at the MZI output. The interferometer may be implemented in a miniaturized on-chip version.

The first element may comprise a splitter, configured to split the input light pulse into the two components, the two components being spatially separated.

The first element may comprise a polarisation controller and a polarizing beam splitter, configured to split the input light pulse into the two components, the two components having different polarisations.

The second element may comprise the polarising beam splitter, and may further comprise a second polarisation controller and a second polarising beam splitter.

The first element may comprise a first polarisation controller and an interface between a polarization maintaining fibre and a single mode fibre configured to split the input light pulse into the two components, the two components having different polarisations.

The second element may comprise the fibre interface, and may further comprise a second polarisation controller and a polarising beam splitter.

The photon source unit may comprise a pulsed laser, wherein the first intensity corresponds to the "on" state of the gain switched laser and the second intensity corresponds to the "off" state of the laser.

The photon source unit may comprise a laser and a second intensity modulator, wherein the second intensity modulator is symmetric and wherein the second intensity corresponds to the minimum transmission state of the second intensity modulator.

At least one part of the first element may also form at least one part of the second element. For example, an asymmetric beam splitter may form both the first and second element.

One or more of the transmitter components may be integrated onto a photonic chip.

One or more fixed low extinction ratio intensity modulators or variable extinction ratio intensity modulators may be coupled in series with a pulsed laser, or with one or more standard intensity modulators and a pulsed laser, or with any photon source unit that outputs at least two intensity levels for example.

The transmitter may use a low extinction ratio intensity modulator, for example in combination with one or more other intensity modulators or in combination with a gain-switched laser.

A quantum communication system comprising the quantum transmitter and further comprising a receiver may also be provided. The quantum communication system may further comprise a second quantum transmitter.

A method of generating intensity modulated photon pulses is provided, comprising:
  generating light pulses at a photon source unit comprising a photon source;
  receiving an input light pulse from the photon source unit at a first intensity modulator;
  splitting the input light pulses into two components at a first element in the first intensity modulator;
  applying a phase shift between the two components at a phase modulator in the first intensity modulator; and
  interfering the two components at a second element in the first intensity modulator, wherein at least one of the first element and the second element is asymmetric.

QKD protocols, for example those using decoy states, may use light pulses having multiple intensity levels. For example, decoy state based QKD protocols may use two or three intensity levels.

In a decoy-state QKD protocol, photon pulses with different intensities are sent which allow the parties to determine the presence of an eavesdropper by measuring the number of pulses which have been safely received with the different intensities. For example, the decoy-state BB84 protocol relies on generating light pulses with three different intensities: signal pulses, decoy pulses, and vacuum pulses. For example, for a decoy-state 8884 protocol, 1% of the pulses may be vacuum pulses, 2% of the pulses may be decoy pulses and 97% of the pulses may be signal pulses, and the following intensity levels may be used (expressed in photon/pulse): $I_1=0.5$ (signal), $I_2=0.1$ (decoy), and $I_3<10^{-4}$ (vacuum), for example. For each generated pulse, Alice randomly selects the intensity, according to the above distribution. At the receiver, Bob records the time when he detects each pulse. Alice then tells Bob the times that she sent out the decoy pulses. Based on the times Bob detects the pulses they can decide if an error has been introduced by Eve.

Such systems use transmitters which are able to generate light pulses with three different intensities (signal pulses, decoy pulses, and vacuum pulses). The preparation of three (or more) intensity levels may be done using three different driving voltages for one or more intensity modulators, or by modulating the gain of a laser for example, as will be explained below.

Figure 1A:
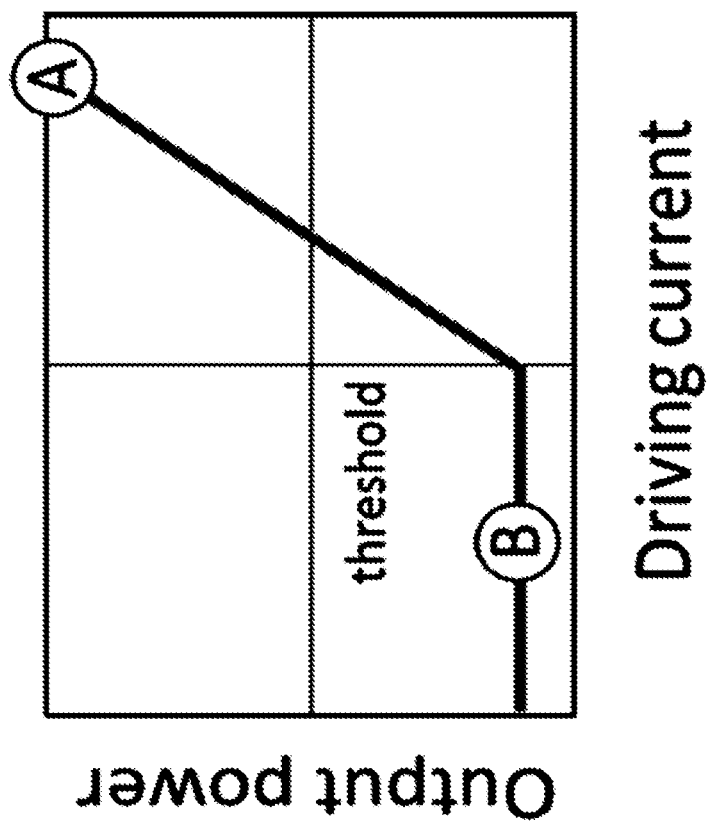

For example, a pulsed laser may be used to generate different intensity levels as follows. A laser may be directly modulated with a driving current signal, such as shown in FIG. 1. FIG. 1 shows a graph of the output laser power with the driving current. The driving current signal may be applied to repeatedly set the laser above (corresponding to point A in FIG. 1) and below (corresponding to point B in FIG. 1) the lasing threshold (indicated by the horizontal line in FIG. 1). In other words, the laser may be switched ON (above threshold) and OFF (below threshold) to generate two intensity levels with high contrast in a stable manner. When the laser is ON (point A), the generated pulses will contain many photons and when the laser is OFF (point B), they will contain close-to-zero photons (this corresponds to a vacuum state). The actual number depends on the extinction ratio of the laser, which may 70 dB for example (i.e. for a mean value of $10^7$ photons emitted when the laser is above threshold, there is a mean value of 1 photon below the threshold). The difference in intensity depends on the difference between stimulated emission (above threshold) and spontaneous emission (below threshold). In QKD systems, a strong attenuator may also be included (for example 70 dB), meaning a pulse emitted above threshold goes from $10^7$ to 1 photon on average (this is the signal pulse "u") and a pulse emitted below threshold goes from 1 to $10^{-7}$ on average (this is the vacuum pulse "w"). The light levels of the pulses generated when the laser is ON and OFF have a high contrast. Thus for each pulse emission time, the current is set at level A or B, and a pulse is generated with the many photon intensity level or the close to zero photon intensity level. Between emission times (between pulses) the current remains at level B.

In order to generate three intensity levels, the pulsed laser may be driven with three (rather than two) different current levels. This option is shown in FIG. 1(b). There is now a third point (point F) that is closer to the threshold current than point A. This corresponds to a generated intensity (or output power) that is lower than that generated at point A. Thus for each pulse emission time, the current is set at level A, F or B, and a pulse is generated with the many photon intensity level (A, corresponding to a signal level), the reduced photon intensity level (F, corresponding to a decoy level) or the close to zero photon intensity level (B, corresponding to a vacuum level). However, since point F is necessarily close to the laser threshold, the light emitted by the laser at point F is not "pure", i.e. it differs from the light emitted at point A in spectral and temporal profile. This can compromise the security of the QKD system.

Figure 2B:
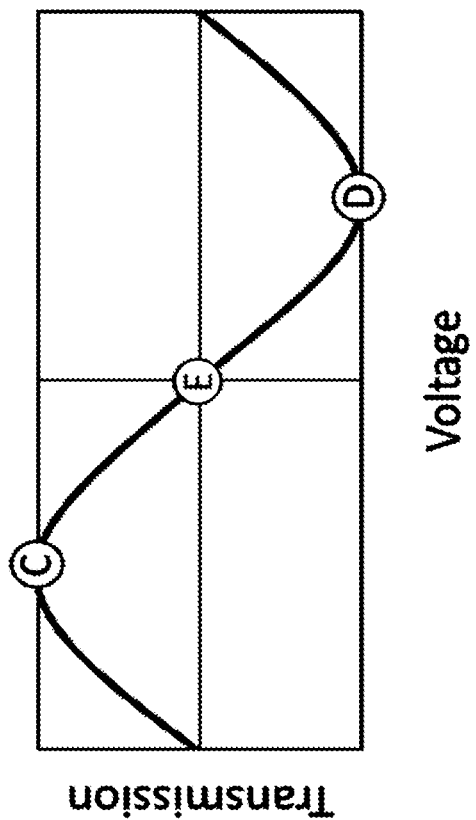
FIGS. 2(a) and (b) show transmission curves of an intensity modulator as a function of the driving voltage of the intensity modulator.
Figure 2A:
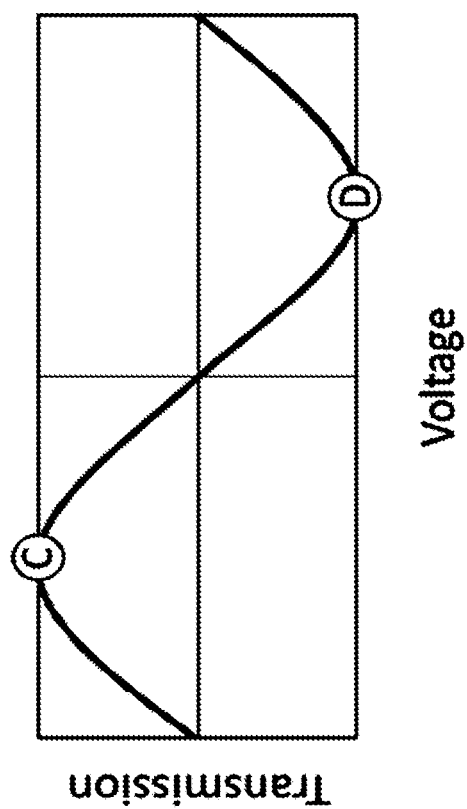

Alternatively, an intensity modulator comprising a balanced, symmetric Mach-Zehnder interferometer (MZI) may be used to generate different intensity levels as follows. A voltage controlled phase modulator may be arranged in at least one of the interferometer arms. By controlling the phase on one arm of the MZI, it is possible to control the transmission emitted by the intensity modulator. For example, by placing an MZI based intensity modulator after a continuous-wave laser, it is possible to modulate the emitted intensity by acting on the driving voltage of the intensity modulator (which controls the phase). The transmission curve of such an intensity modulator as function of the driving voltage of the intensity modulator is shown in FIG. 2. The voltage on the horizontal axis is set at either of points C and D. These points correspond to maximum transmission (C) and maximum attenuation (D), thus corresponding to two different output intensity levels. Both points C and D correspond to flat regions of the transmission curve, and are therefore stable, since any fluctuation in the applied voltage (horizontal axis) only entails a small fluctuation in the transmission (vertical axis). Thus using a Mach-Zehnder based interferometer together with a continuous-wave laser it is possible to generate two intensity levels in a stable way. The vertical distance between point C and D corresponds to the extinction ratio $E_{CD}=1$ of the intensity modulator, and determines the contrast between the two intensity levels of the emitted pulses. The extinction ratio of the intensity modulator is fixed. The extinction ratio will be defined later on.

In order to generate three intensity levels, a state that is halfway between the intensity corresponding to D and the intensity corresponding to C may be generated for example. The corresponding point is shown as point E in FIG. 2(b). This point falls in a region where the transmission is linear with the voltage, thus any fluctuation in the voltage is exactly reproduced in the transmission. This intensity level is therefore not stable (as opposed to points C and D in the figure, which are stable). It is easily seen that it is not possible to prepare all three states in a stable manner, since the third level (point E) will always fall in or close to the linear region of the transmission curve. The instability of the third intensity level may pose a security risk for QKD. For instance, a QKD system where the third intensity fluctuates by more than 30% is deemed insecure because of this issue. Moreover, such a large fluctuation can affect the efficiency of the system.

Alternatively, the intensity modulator discussed in relation to FIG. 2 may be used together with the pulsed laser discussed in relation to FIG. 1 to generate three levels of intensity in a stable manner, by combining: point A on the laser and point C on the intensity modulator (signal pulse); point A on the laser and point D on the intensity modulator (decoy pulse); or the remaining combinations B-C or B-D (which both provide an output intensity that is close to zero, i.e. vacuum pulse). The difference in intensity between these states is determined by the extinction ratio (=1) of the intensity modulator. The highest intensity will be achieved by the combination AC. The combination AD provides an output intensity that is $X_{ER}$ times the one obtained from the combination AC, with $X_{ER}$ a function of the extinction ratio ER of the intensity modulator:

$$X_{ER} = \frac{1-ER}{1+ER}$$

A close to zero intensity is emitted for the combinations BC and BD (the transmission for BC is higher than for BD, but the light initially emitted by the laser, which is below the threshold, is always close to zero). Thus although these states are stable, the intensity levels are high contrast and are set by the extinction ratio of 1 of the intensity modulator.

As for the first case where a pulse laser is used to generate the different intensity states, an attenuator is also included. The attenuator may be included before the intensity modulator or after the intensity modulator, but in both cases is included before the quantum transmission channel.

The vacuum state is often not essential to performance, thus alternatively, decoy state protocols may be implemented with only two states, the decoy and signal state. Although the systems shown in FIGS. 1 and 2 can produce two different intensity levels in a consistent and stable manner, the intensity levels have a maximum intensity difference. For many applications, including decoy state protocols, it may be desirable for the intensity levels to be closer in intensity, for example with a 4 dB or 6 dB difference. As has been described above for the three or more intensity level case, such an intensity difference may be generated using point F in FIG. 1(b), (which may cause differences in spectral and temporal profile between the different intensity pulses) or using point E in FIG. 2(b) (which may cause instability) for example.

A photon source unit together with a first intensity modulator comprising an asymmetric element may be used to generate low contrast, stable intensity states. Stable generation of optical pulses with two or more different intensities including at least one low-contrast pair of intensities can be achieved. For example, a transmitter comprising these elements can prepare in a stable manner the following intensity levels (expressed in photon/pulse):

$I_1=0.5$ (signal), $I_2=0.125$ (decoy), and optionally $I_3<10^{-4}$ (vacuum)

used for a decoy state QKD system. Preparation of these states uses an intensity modulator with a 6 dB (i.e. ¼) extinction ratio.

The photon source unit together with a first intensity modulator comprising an asymmetric element can be used to output intensity states with low fluctuation and with corresponding frequency and temporal profiles, thus improving the security of the system.

Figure 3A:
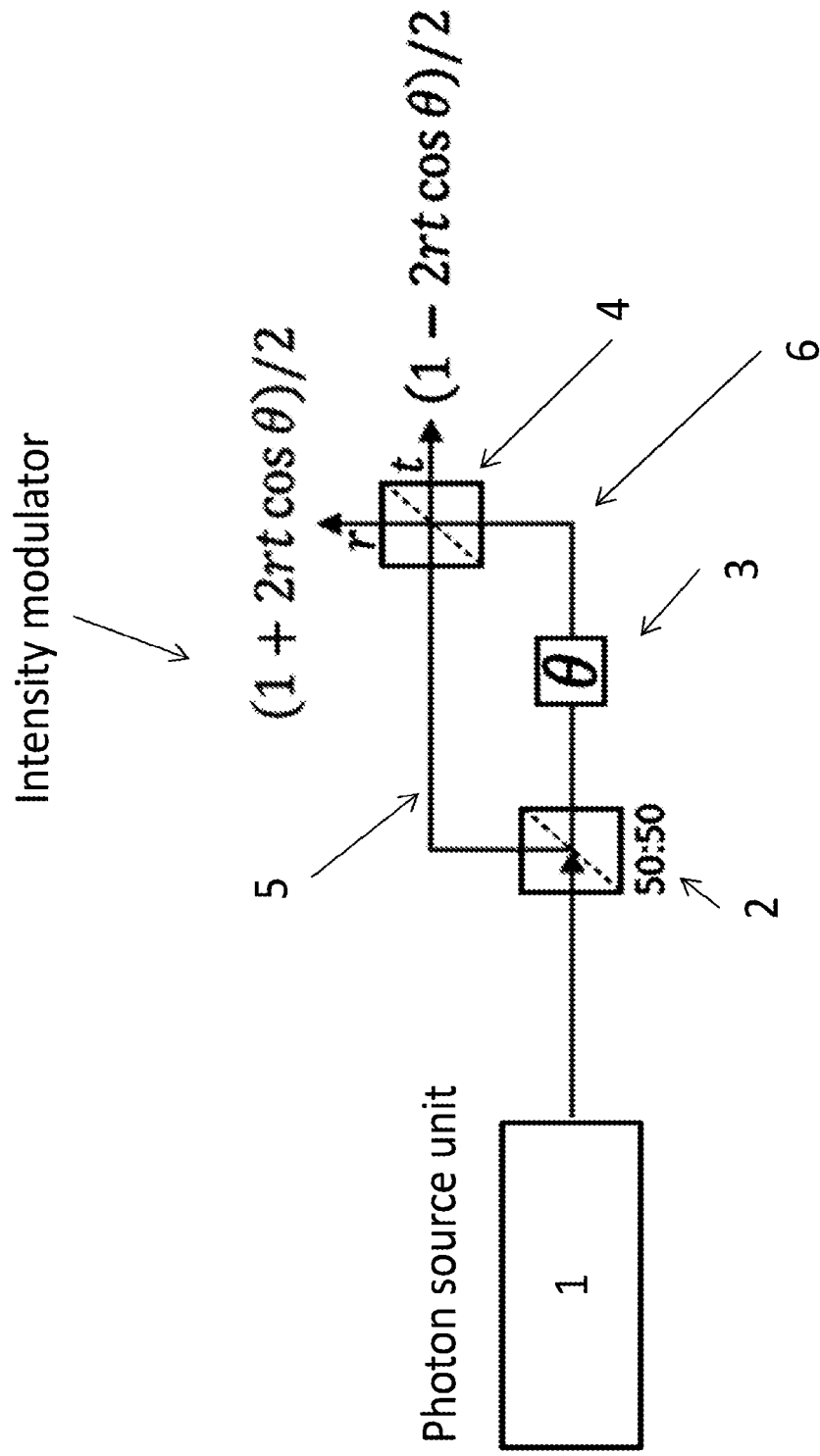
FIG. 3(a) shows an example of a transmitter for a quantum communication system comprising an intensity modulator comprising an asymmetric beam splitter.

FIG. 3(a) shows an example of a transmitter for a quantum communication system. The transmitter comprises a photon source unit 1 comprising a photon source. The photon source unit 1 is configured to emit light pulses having a first intensity and a second intensity, the second intensity being lower than the first intensity. In this example, the photon source is a pulsed laser, where the first intensity corresponds to the ON state and the second intensity corresponds to the OFF state. Alternatively however, the photon source may be a CW laser and the photon source unit 1 may comprise an intensity modulator. The configuration of the photon source unit 1 will be discussed in more detail in relation to FIG. 5.

The transmitter further comprises a first intensity modulator, configured to receive an input light pulse from the photon source unit 1. The first intensity modulator is based on a Mach-Zehnder interferometer. The first intensity modulator comprises a first element 2 (also referred to as the input element). The first element 2 is configured to split an input light pulse into two components, one which exits through a first output port and one which exits through a second output port. The first element 2 is a symmetric (i.e. 50:50) beam splitter, therefore the intensity of the two components is equal.

The intensity modulator comprises two arms, a first arm 5 and a second arm 6. The second arm 6 comprises a phase modulator 3. The phase modulator is configured to apply a phase shift between the two arms. The interferometer is balanced, i.e. the optical path length of both arms is the same, such that the phase difference applied by the phase modulator 3 is the only phase difference applied between the two components in the two arms.

The first intensity modulator further comprises a second element 4 (also referred to as the output element), which is an asymmetric beam splitter. The first arm 5 couples a first output port of the input element 2 to a first input port of the output element 4, the second arm 6 couples a second output port of the input element 2 to a second input port of the output element 4, via the phase modulator 3. The output element has a first output port (labelled r) and a second output port (labelled t). The second element 4 is configured to interfere the two components, which re-combine at the second element 4. Throughout the specification, the coefficients r and t are referred to, which correspond to the reflectance and transmittance coefficients for a prism or half mirror based beam splitter design. However, the beam splitters may be implemented by fibre-based couplers (or some other design) for example, in which case the distinction between reflected and transmitted light is not necessary, and 't' and 'r' simply correspond to light emerging from port 1 and port 2 for example.

The first intensity modulator is a low extinction ratio intensity modulator, which uses an asymmetric beam splitter. In this specification, a low extinction ratio means an extinction ratio of less than or equal to 0.9 (i.e. 90% of the maximum ER). The first intensity modulator in this example thus comprises a Mach Zehnder interferometer with a 50:50 input beam splitter 2 and with an output beam splitter 4 with reflection and transmission coefficients r, t≤1, where $r^2+t^2=1$, and r≠t (for a symmetric beam splitter, r=t=1/√2, for an asymmetric beam splitter r≠t). For example, r≠0 and t≠0, i.e. the beam splitter is a partially asymmetric beam splitter. Thus when a single light pulse having an intensity I is inputted into one of the inputs of the output beam splitter, the intensity output from one port is $|r|^2$ times the input intensity I and the intensity output from the other port is $|t|^2$ times the input intensity.

Since the output beam splitter 4 is an asymmetric beam splitter, when a single multi-photon light pulse is input into one of the input ports of the beam splitter 4, the intensity of a first component (output through a first output port) is not equal to the intensity of a second component (output through a second output port). The output beam splitter 4 thus has a splitting ratio smaller than 1, where the splitting ratio is the ratio of the component output through a first output port to the component output through the second output port.

The phase modulation corresponds to a modulation in the intensities outputted by the output beam splitter 4. FIG. 3(*b*) shows the transmission curves corresponding to each output port of the output beam splitter, where the voltage (on the horizontal axis) corresponds to the phase θ. The transmission curves are both centred around a transmission value of 0.5. The output intensity at a first port of the output beam splitter 4 (labelled r in the figure and shown with the dashed line) corresponds to the intensity of the light pulse inputted to the input element 2 multiplied by (1+2rt cos θ)/2, and the output intensity at a second port of the output beam splitter 4 (labelled t in the figure and shown with the solid line) corresponds to the intensity of the light pulse inputted to the input element 2 multiplied by (1−2rt cos θ)/2. The transmission coefficients of the two output ports of the intensity modulator are therefore (1+2rt cos θ)/2 and (1−2rt cos θ)/2 respectively.

The extinction ratio ER of the intensity modulator depends on the coefficients r and t. The extinction ratio ER is defined as:

ER=(max−min)/(max+min).

where max is the maximum intensity output through one port and min is the minimum intensity output through the port. In this case the max is obtained for case)=1 and the min is obtained for cos θ=−1 and so the ER=2rt.

For example, if r=0 and t=1, ER=0 (fully asymmetric) and if r=t=1/√2, then ER=1 (symmetric).

To obtain an extinction ratio of 0.25 for example (corresponding to 6 dB) and produce a maximum $I_1$=0.5 (signal) and minimum $I_2$=0.125 (decoy), a beam splitter where r=0.126 and t=0.996 or r=0.966 and t=0.126 (partially asymmetric) may be used for example. In another example, r=√0.8=0.9, t=√0.2=0.45, and ER=2√0.16=0.8 (partially asymmetric).

During operation, the pulsed light source 1 periodically generates pulses having a first intensity (ON for a pulsed laser—point A in FIG. 1) or a second intensity (OFF for a pulsed laser—point B in FIG. 2). The pulses are inputted into the intensity modulator. Pulses output from the second output t of the intensity modulator may be used for the quantum communication for example. The voltage applied to the phase modulator 3 is controlled for each input light pulse to the voltage corresponding to point C or point D. The three output intensities correspond to the combination A and C (signal), A and D (decoy) and either of B and C or B and D (vacuum). The phase modulator 3 comprises a first setting corresponding to destructive interference (D) at the second element 4, wherein when the input light pulse has the first intensity (ON), an output light pulse at one output of the second element 4 has a third intensity when the phase modulator 3 has the first setting, the third intensity (decoy) being less than the first intensity (ON) and greater than the second intensity (OFF—vacuum). The phase modulator 3 further comprises a second setting corresponding to constructive interference (C) at the second element 4, wherein when the input light pulse has the first intensity (ON), an output light pulse at the output of the second element has a fourth intensity (signal) when the phase modulator 3 has the second setting, wherein the fourth intensity (signal) is greater than the third intensity (decoy) and less than the first intensity (ON).

Alternatively or additionally, the pulses output from the other output may be used. In this case, when the input light pulse has the first intensity (ON), an output light pulse at a first output (r) of the second element 4 has the fourth intensity (signal) when the phase modulator 3 has the first setting and an output light pulse at the output of the second element 4 has the third intensity (decoy) when the phase modulator 3 has the second setting.

The components may be connected using waveguides, such as optical fibres.

Alternatively, the system may be implemented with free-space optics. Thus the arms of the intensity modulator and the connections between the components may comprise optical fibres, including fibre coupled beam splitters. Alternatively, free space beam splitters such as half silvered mirrors may be used. The phase modulator 3 may comprise a resistive heater which heats a section of the waveguide. Alternatively, the phase modulator may comprise a material which exhibits an electro-optic effect, whereby a phase change can be realised by applying an electric field across the material. For example, the phase modulator may comprise a crystal which replaces a section of the waveguide, such as a $LiNbO_3$ crystal, in which the refractive index is a function of electric field strength. The photon source unit may comprise a semiconductor laser diode. Alternatively, the laser may be a fibre laser or a solid state laser. A continuous wave laser (for example a 1550 nm or a 1310 nm wavelength laser) may be used, or a pulsed laser (for example a distributed feedback laser) may be used.

Figure 3B:
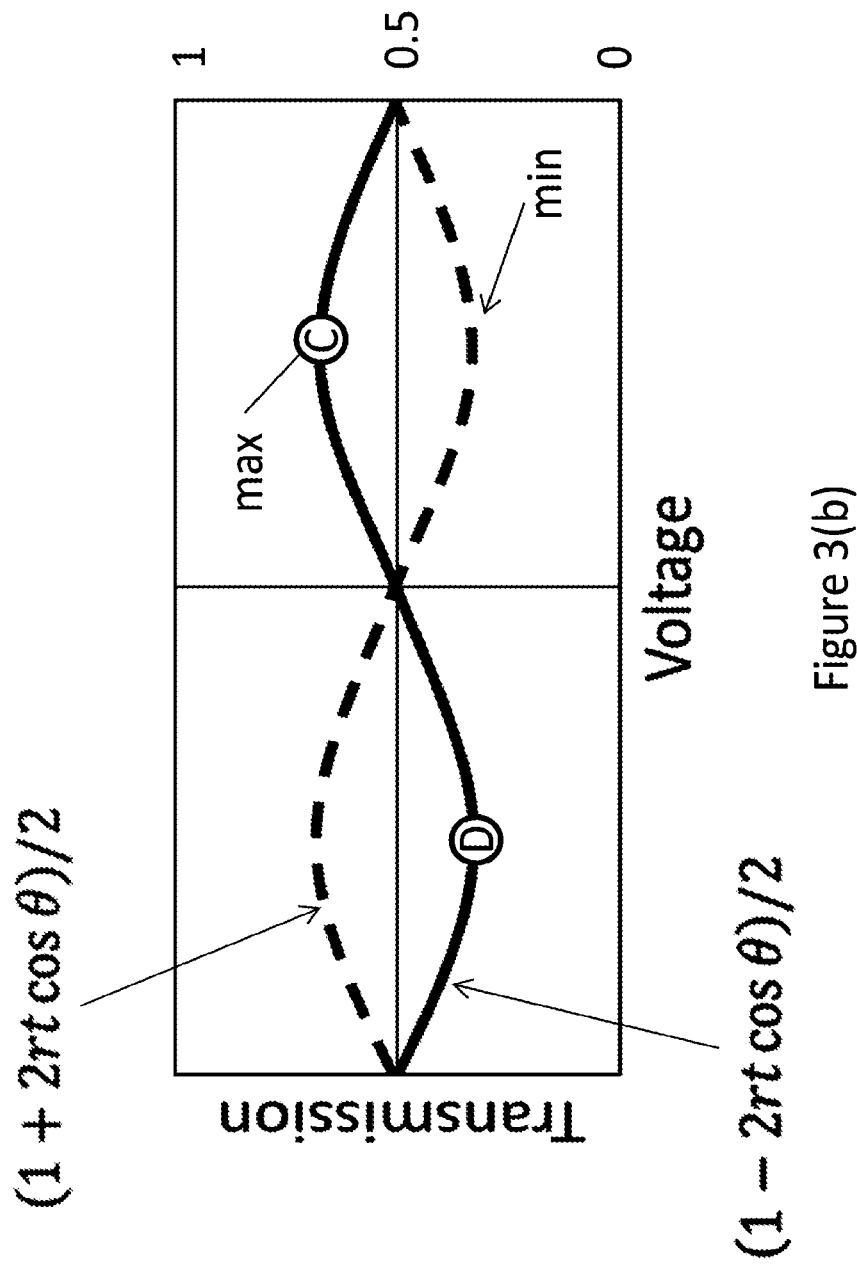
FIG. 3(b) shows the transmission curves of the intensity modulator.

Although in the described transmitter, a symmetric input element 2 and an asymmetric output element 4 are used, alternatively an asymmetric input element 2 and a symmetric output element 4 may be used. The same transmission curves shown in FIG. 3(b) are generated in this case.

Although in the described transmitter, an asymmetric beam splitter 4 has been used as the output element, alternatively the first intensity modulator may comprise a symmetric input beam splitter, a symmetric output beam splitter and an amplitude attenuation element placed in one of the interferometer arms. The amplitude attenuation element may be fixed for example. In this case, the first element may comprise a symmetric beam splitter together with the amplitude attenuation element. These components together form an asymmetric input element, and together are configured to split the input light pulse into two components with unequal intensities. The second element comprises a symmetric beam splitter, which is configured to interfere the two components. If the amplitude attenuation element is place after the phase modulator for example, then the first element instead comprises the symmetric input beam splitter, and the second element is asymmetric and comprises the symmetric output beam splitter and the amplitude attenuation element. The resulting intensity modulator functions in the same manner as that described in relation to FIG. 3.

In the above transmitter and the below described transmitters, a high intensity light pulse is initially emitted from a laser. An attenuator is included to reduce the intensity, for example such that the average intensities are less than 1 photon per pulse for protocols such as BB84. Other intensities may be used (for example for continuous variable based protocols, higher intensities may be used). The light from the laser is attenuated before it reaches the quantum transmission channel, and therefore the attenuator may be placed before or after the intensity modulator for example.

In the above transmitter and the below described transmitter, generation of three or more intensity levels is described (e.g. vacuum state, decoy state and signal state). However, alternatively, the systems may be used to generate only two intensity levels (e.g. decoy state and signal state). For example, the difference in the intensity levels may be less than 6 dB.

Figure 4A:
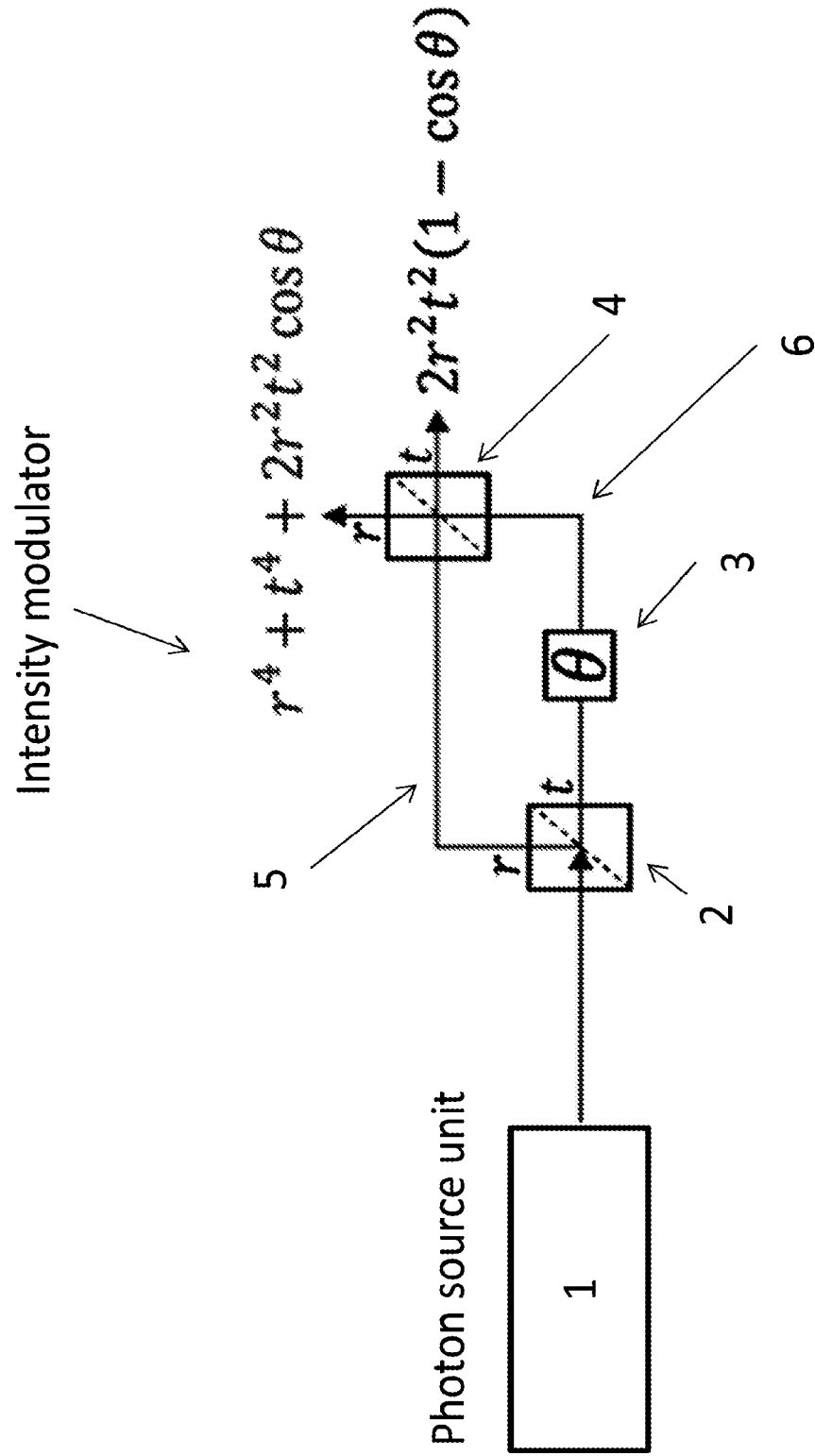
FIG. 4(a) shows an example of another transmitter for a quantum communication system comprising an intensity modulator comprising two asymmetric beam splitters.

FIG. 4(a) shows an example of another transmitter for a quantum communication system. The transmitter of FIG. 4(a) is the same as the transmitter of FIG. 3(a), except that in addition to an asymmetric output element 4, the intensity modulator also comprises an asymmetric input element 2. Description of the elements already described in relation to FIG. 3(a) will be omitted.

The first element 2 is configured to split an input light pulse into two components, one which exits through a first output port and one which exits through a second output port. The first element 2 is an asymmetric beam splitter, therefore the intensity of the two components is unequal. The input beam splitter 2 has reflection and transmission coefficients r, t≤1, where $r^2+t^2=1$, and r≠t. The input beam splitter 2 thus has a splitting ratio less than 1, where the splitting ratio is the ratio of the component output through a first output port to the component output through the second output port. For example, r≠0 and t≠0, i.e. the beam splitter is a partially asymmetric beam splitter.

Figure 4B:
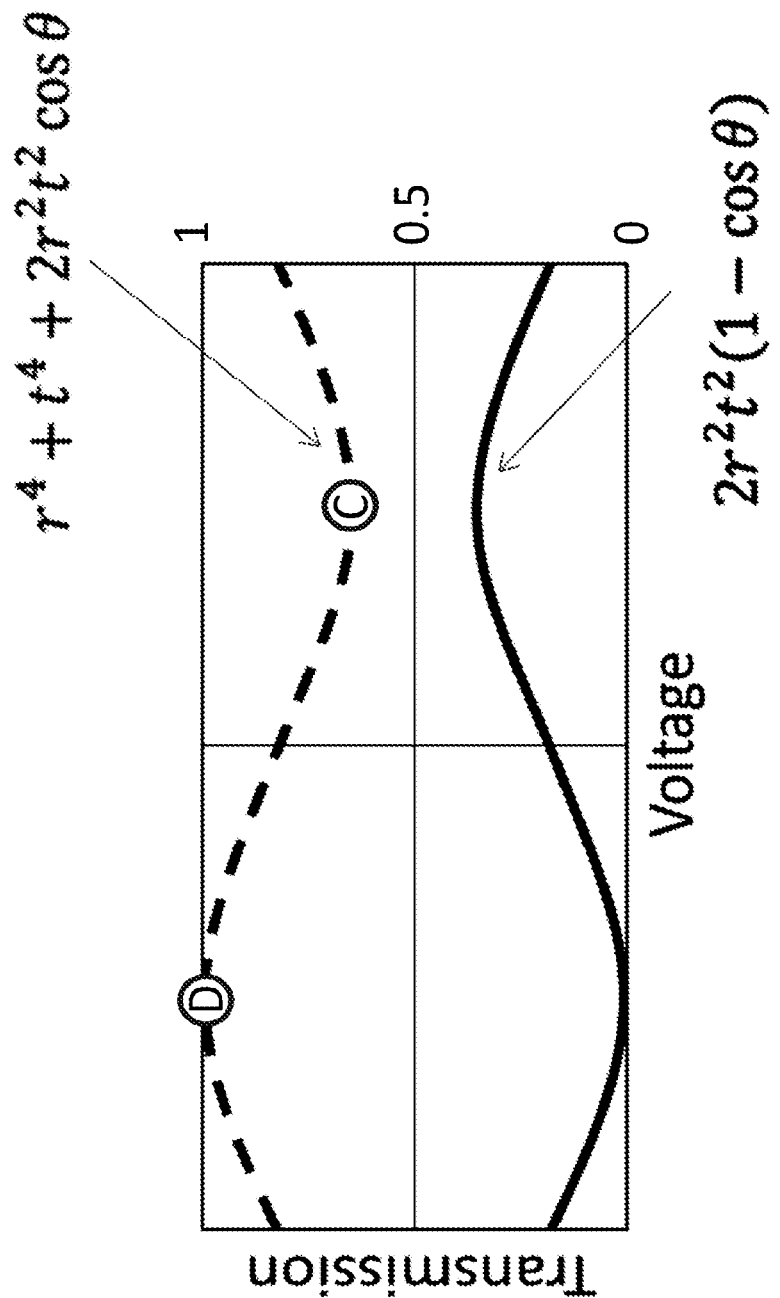
FIG. 4(b) shows the transmission curves of the intensity modulator.

In this example, the input and output beam splitters are identical and have the same coefficients r and t. The phase modulation corresponds to a modulation in the intensities outputted by the output beam splitter 4. FIG. 4(b) shows the transmission curves corresponding to each output port of the output beam splitter 4, where the voltage (on the horizontal axis) corresponds to the phase θ. The output intensity at a first port of the output beam splitter 4 (labelled r in the figure and corresponding to the dashed curve) corresponds to the intensity of the light pulse inputted to the input element 2 multiplied by $r^4+t^4+2r^2t^2 \cos θ$, and the output intensity at a second port of the output beam splitter 4 (labelled t in the figure and corresponding to the solid curve) corresponds to the intensity of the light pulse inputted to the input element 2 multiplied by $2r^2t^2(1-\cos θ)$. The transmission coefficients of the two output ports of the intensity modulator are therefore $r^4+t^4+2r^2t^2 \cos θ$ and $2r^2t^2(1-\cos θ)$ respectively.

The extinction ratio depends on the values of r and t. For the first output r the extinction ratio is:

$$ER = 2r^2t^2/(r^4+t^4)$$

To obtain an ER=0.5 (3 dB), r=0.888 and t=0.46 or r=0.46 and t=0.888 (partially asymmetric).

The transmission curve on top (dashed curve corresponding to the first output r, i.e. the top port of the output beam splitter 4 in the figure) reaches the maximum transmission value 1. This means that zero intrinsic insertion loss can be obtained for one of the output ports. The transmission curves are centred around different transmission values in this case.

Considering the first output (r), the three output intensities correspond to the combination A and D (signal), A and C (decoy) and either of B and C or B and D (vacuum). For the second setting of the phase modulator 3, corresponding to constructive interference (C) at the second element 4, when the input light pulse has the first intensity (ON), an output light pulse at one output of the second element 4 has a third intensity, the third intensity (decoy) being less than the first intensity (ON) and greater than the second intensity (OFF—vacuum). For the first setting corresponding to destructive interference (D) at the second element 4, when the input light pulse has the first intensity (ON), an output light pulse at the output of the second element has a fourth intensity (signal), wherein the fourth intensity (signal) is greater than the third intensity (decoy) and equal to the first intensity (ON) (taking into account any small loss in the fibres, which in practice does not have a great effect on the intensities and therefore is not taken into account in the present description).

Alternatively or additionally, the pulses output from the other output may be used. In this case, when the input light pulse has the first intensity (ON), an output light pulse at the output of the second element 4 has a fifth intensity when the phase modulator 3 has the second setting (C), the fifth intensity being greater than the second intensity (OFF) and less than the third intensity (decoy). An output light pulse at the output of the second element 4 has a sixth intensity (OFF) when the phase modulator 3 has the first setting (D).

Although in this case, the input beam splitter 2 and the output beam splitter 4 have the same coefficients r and t, and thus the same amount of asymmetry, alternatively beam splitters with differing coefficients may be used.

Figure 5A:
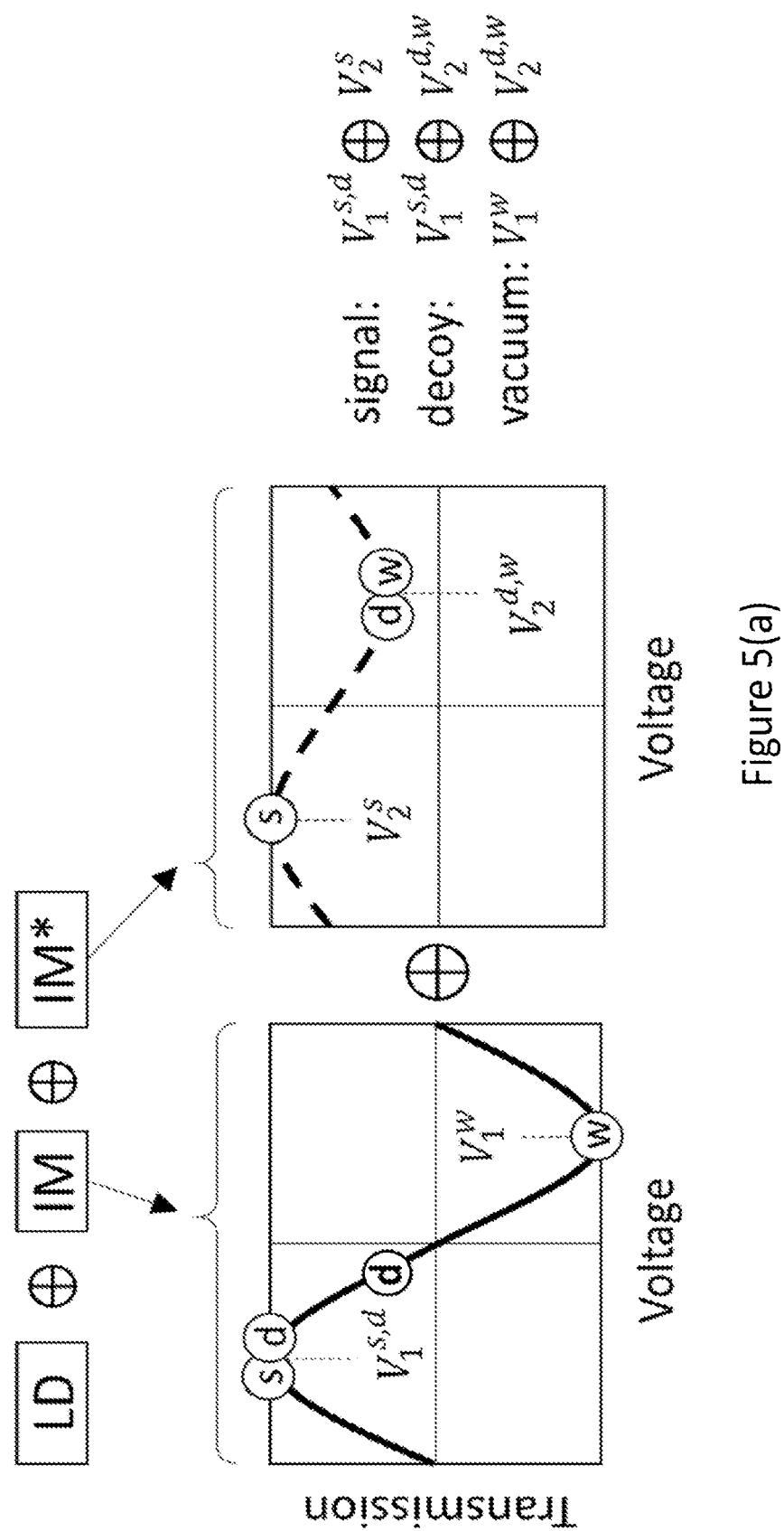
FIG. 5(a) shows an intensity modulator comprising an asymmetric element coupled in series with a laser diode and an intensity modulator.

FIG. 5(a) shows a first intensity modulator (IM*) such as described in relation to FIG. 4(a), coupled in series with a laser diode (LD), e.g. a pulsed laser diode, and a second intensity modulator (IM), where the second intensity modulator is symmetric (i.e. such as described in relation to FIG. 2 for example). Such a system may be used to implement decoy-state QKD. In this system, the photon source unit 1 comprises a laser and a symmetric intensity modulator.

In such a system it is possible to prepare three intensities for decoy-state QKD (signal, decoy, vacuum) with high stability, since all the three states (including the decoy state) are obtained from voltages that correspond to maxima or minima of the transmission curves of both intensity modulators, making them more resilient to fluctuations in the applied voltages.

The figure shows the transmission curves for the second intensity modulator IM and the first intensity modulator IM* (which corresponds to the first intensity modulator in FIG. 4(a) in this case).

To obtain an output light pulse corresponding to a signal pulse, a first voltage $V^{s,d}_1$ is applied to the intensity modulator, corresponding to a maximum transmission (or minimum attenuation). A second voltage $V^s_2$ is applied to the intensity modulator IM*, also corresponding to maximum transmission through the first output port r (and corresponding to the first setting D). Since both intensity modulators have zero intrinsic insertion loss, the output signal pulse should have the same intensity as the light inputted to the intensity modulator (taking into account any signal loss in the fibres for example). The resultant intensity is the fourth intensity.

To obtain an output light pulse corresponding to a decoy pulse, the first voltage $V^{s,d}_1$ is applied to the intensity modulator, corresponding to a maximum transmission. A second voltage $V^{d,w}_2$ is applied to the intensity modulator IM*, which corresponds to minimum transmission through the first output port r (corresponding to the second setting C). The resultant intensity is the third intensity.

To obtain an output light pulse corresponding to a vacuum pulse, a first voltage $V^w_1$ is applied to the intensity modulator, corresponding to a minimum transmission (or maximum attenuation). The second voltage $V^{d,w}_2$ is applied to the intensity modulator IM*. The resultant intensity is the second intensity.

By applying these combinations of voltages, all the states may be prepared using the flattest i.e. the most stable regions of the transmission curves.

The photon source unit may comprise a continuous wave laser together with a intensity modulator. This can be viewed as equivalent to a pulsed laser.

Figure 5B:
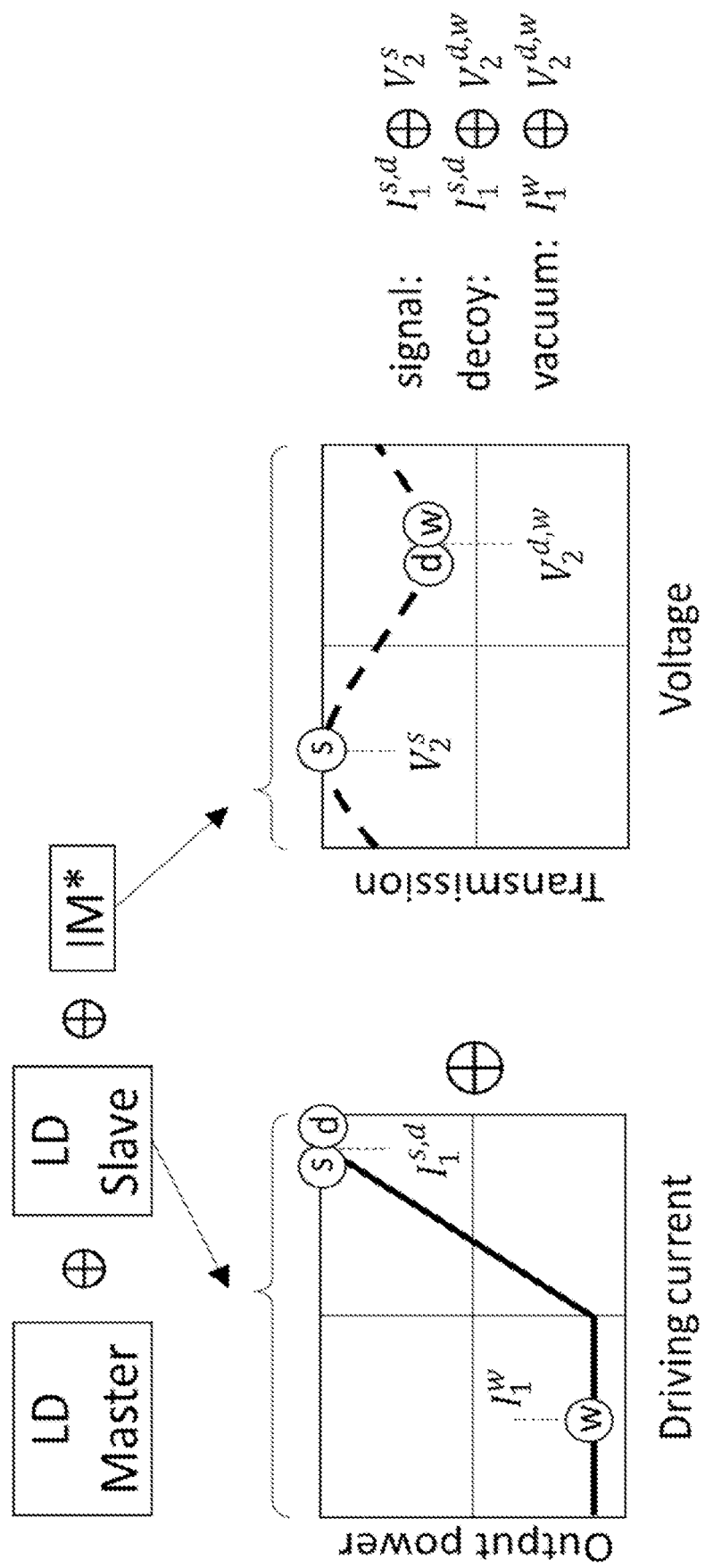
FIG. 5(b) shows the intensity modulator instead coupled directly to a laser.

FIG. 5(b) shows the case where the intensity modulator IM* is coupled directly to a laser, for example a slave pulsed laser. This can also be used for decoy-state QKD. In this case, laser-seeding is used, in other words the photon source unit comprises a master laser and a slave laser.

The figure shows the emission for the slave laser and the transmission curve for the intensity modulator IM* (which corresponds to the first intensity modulator in FIG. 4(a) in this case).

To obtain an output light pulse corresponding to a signal pulse, a first voltage $I^{s,d}_1$ is applied to the slave laser, corresponding to a maximum emission (setting A). A second voltage $V^s_2$ is applied to the intensity modulator IM*, corresponding to maximum transmission through the first output port r (and the first setting D). Since the intensity modulator has zero intrinsic insertion loss, the output signal pulse should have the same intensity as the light inputted to the intensity modulator (taking into account any signal loss in the fibres for example). The resultant intensity is the fourth intensity.

To obtain an output light pulse corresponding to a decoy pulse, the first current $I^{s,d}_1$ is applied to the slave laser, corresponding to maximum emission. A second voltage $V^{d,w}_2$ is applied to the intensity modulator IM*, which corresponds to minimum transmission through the first output port r (and a second setting C). The resultant intensity is the third intensity.

To obtain an output light pulse corresponding to a vacuum pulse, a first voltage $V^w_1$ is applied to the slave laser, corresponding to a minimum emission. The second voltage $V^{d,w}_2$ is applied to the intensity modulator IM. The resultant intensity is the second intensity.

By applying these driving currents and the voltages, all the states may be prepared in a stable manner. The stability comes from using the maxima/minima of the transmission curve and the ON or OFF states for the laser (i.e. above or below threshold).

The above described systems may be implemented using fibre optic components for example. Alternatively however, the intensity modulator may be implemented on a chip. This reduces phase noise or drift, due to the small size of the chip. In particular, due to the small size of the chip, the two arms of the interferometer experience the same temperatures and the same encodings in phase. Chip based implementations in which fixed-ratio and variable-ratio (or tunable-ratio) interferometers are used are described below. Variable-ratio beam splitters can also be realised using fibre based optics, for example using the Sagnac interferometer based on polarization described in FIG. 10 below (in which by rotating the polarization, the splitting ratio of the beam splitter is effectively varied).

Figure 6:
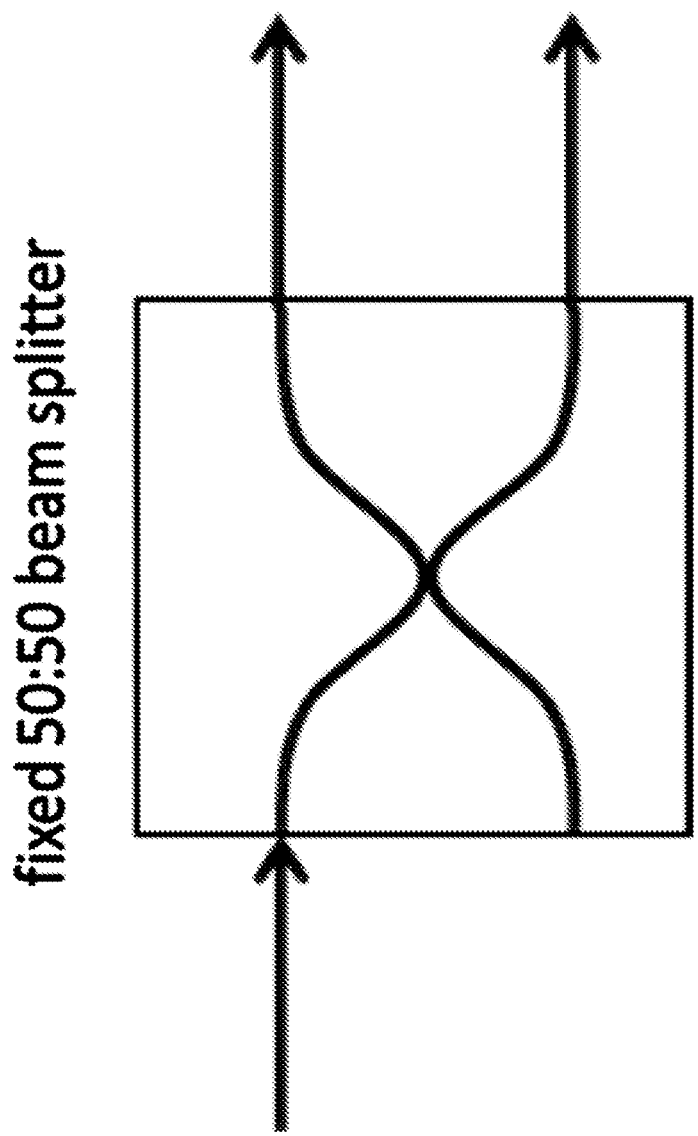
FIG. 6 is a schematic illustration of a symmetric beam splitter integrated on a photonic chip.

In a fixed-ratio interferometer, the splitting ratio of the beam splitters is fixed. For example, FIG. 6 is a schematic illustration of a 50:50 beam splitter integrated on a photonic chip, or waveguide. This is a directional coupler realized by carving two equal output paths from the input path. This beam splitter may be used in an intensity modulator such a described in relation to FIG. 3(a) for example (e.g. as the symmetric input element) when implemented on a chip.

By designing the directional coupler appropriately, or by using MMI (Multi-Mode Interference), any fixed splitting ratio can easily be fabricated. For example, this may be done by varying the distance between the paths in the waveguide, or their length, or other features. Such a coupler may be used in an intensity modulator such as described in relation to FIGS. 3 and 4 for example, when implemented onto a chip (i.e. as the asymmetric beam splitters). These kind of directional couplers are narrow-band, but easy to fabricate. An MMI based implementation is broadband. If a particular fixed splitting ratio is decided before the device is fabricated, and variability is not desired, then the configuration in FIG. 6 can be fabricated with the selected splitting ratio. Such couplers may be fabricated with a small size.

Figure 7:
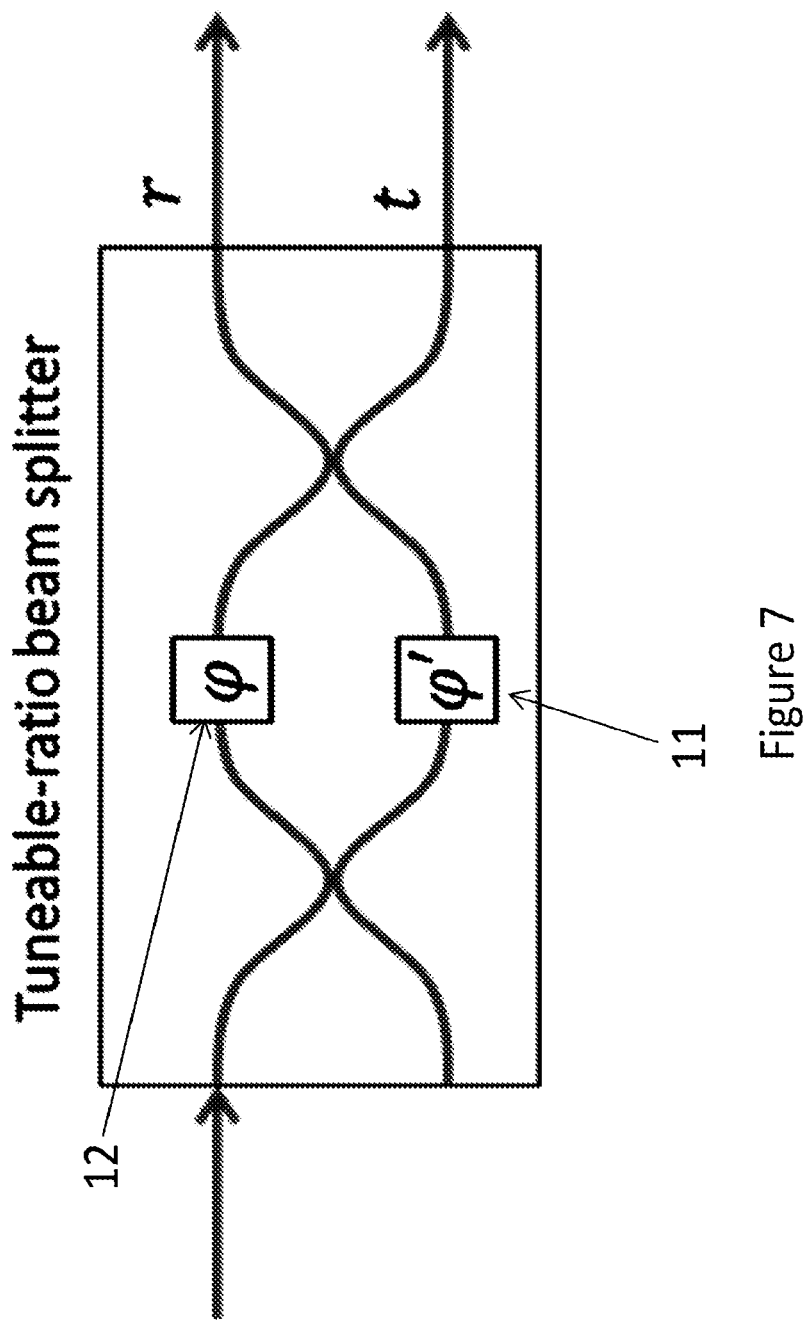
FIG. 7 is a schematic illustration of a tunable-ratio beam splitter realized using a Mach Zehnder interferometer design with two integrated phase modulators.

For a variable ratio, FIG. 7 shows a schematic illustration of a tunable-ratio beam splitter realized using a Mach Zehnder interferometer design with two integrated phase modulators 11 and 12. The values r and t of the beam splitter (corresponding to the coefficient at each output) depend on the relative phase of the phase modulators $\Delta\varphi=\varphi-\varphi'$. For example, if $\Delta\varphi=0$, r=1 and t=0 whereas if $\Delta\varphi=\pi$, r=0 and t=1. High speed phase modulators may be used, for example GHz and above. Although two phase modulators are shown, one phase modulator would suffice. Two identical phase modulators are used here simply to equalise losses on the two arms.

Figure 8:
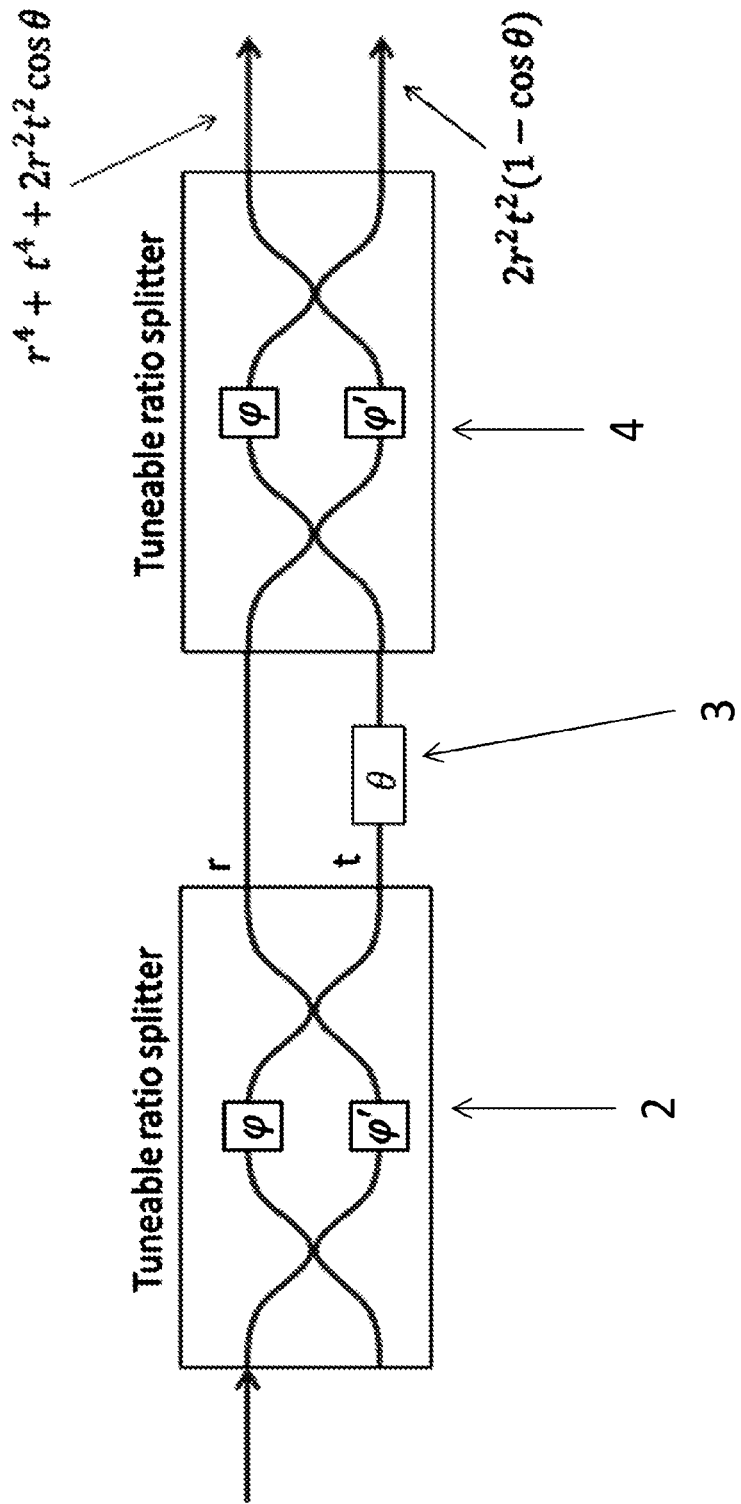
FIG. 8 is a schematic illustration of an intensity modulator implemented using two tunable-ratio beam splitters.

The coefficients r and t of the beam splitter are variable (by varying the phase of the phase modulators). By using one or more of such beam splitters, a variable extinction ratio intensity modulator may be fabricated. The extinction ratio can then be tuned according to the particular requirements of each implementation. Such an intensity modulator may be implemented on a chip as shown in FIG. 8 for example. The first element (input element 2) is a variable beam splitter and the second element (output element 4) is also a variable beam splitter. The beam splitters together form a MZI, with the phase modulator 3 located in one of the arms. The intensity modulator in FIG. 8 may be used in place of the intensity modulator described in relation to FIGS. 3 and 4 for example, where the coefficients r and t are set by the phase modulators in each variable beam splitter.

For example, the phase modulators used for an on-chip implementation may be "carrier injection" (CI) or "quantum-confined Stark effect (QCSE) traveling wave" based modulators, located in waveguides based on a P-I-N structure for example. In both cases, a phase modulation is applied to a section of the waveguide by application of voltage. In both cases, the chips may be fabricated using active materials, for example semiconductor hetero-structures comprising an active medium (e.g. quantum well, multiple quantum well, layer of quantum dots etc.), in which electronic states can be excited. In addition, further layers surrounding the active layer(s) may be doped with an excess of positive charges (P) or negative charges (N). Materials for photonic integration include but are not limited to III-V materials such as Indium Phosphide, Gallium Arsenide, Gallium Nitrides for example.

In the former case, phase modulation is achieved by modulating the carrier density, i.e. the density of free electrons in the conduction band in a section of the waveguide. Applying a forward bias to a PIN junction across the section of the waveguide generates free carriers (and thus current) in the waveguide, thus modifying the effective refractive index of the section of the waveguide. Thus in "carrier injection" based phase modulators, the conduction band of an active waveguide section is excited. This modifies the effective index of the whole waveguide section. Depending on the electric field applied, the density in the modulator structure (an active P-I-N waveguide) may be modulated.

In the case of the QCSE based modulator, phase modulation is achieved by modulating the effective band gap in the P-I-N waveguide. Applying a reverse bias across the P-I-N waveguide modifies the effective gap of the structure, which leads to a phase change for travelling light. When the reverse bias is applied at high frequency (e.g. GHz and above) at one end of the P-I-N waveguide (while the other end is kept grounded) the gap modification propagates as a traveling wave along the modulator (P-I-N waveguide). In general the P-I-N waveguides are designed such that the gap perturbation propagates at the same speed as light pulses in the structure. QCSE phase modulators can be operated at higher frequencies than CI based phase modulators.

Figure 9:
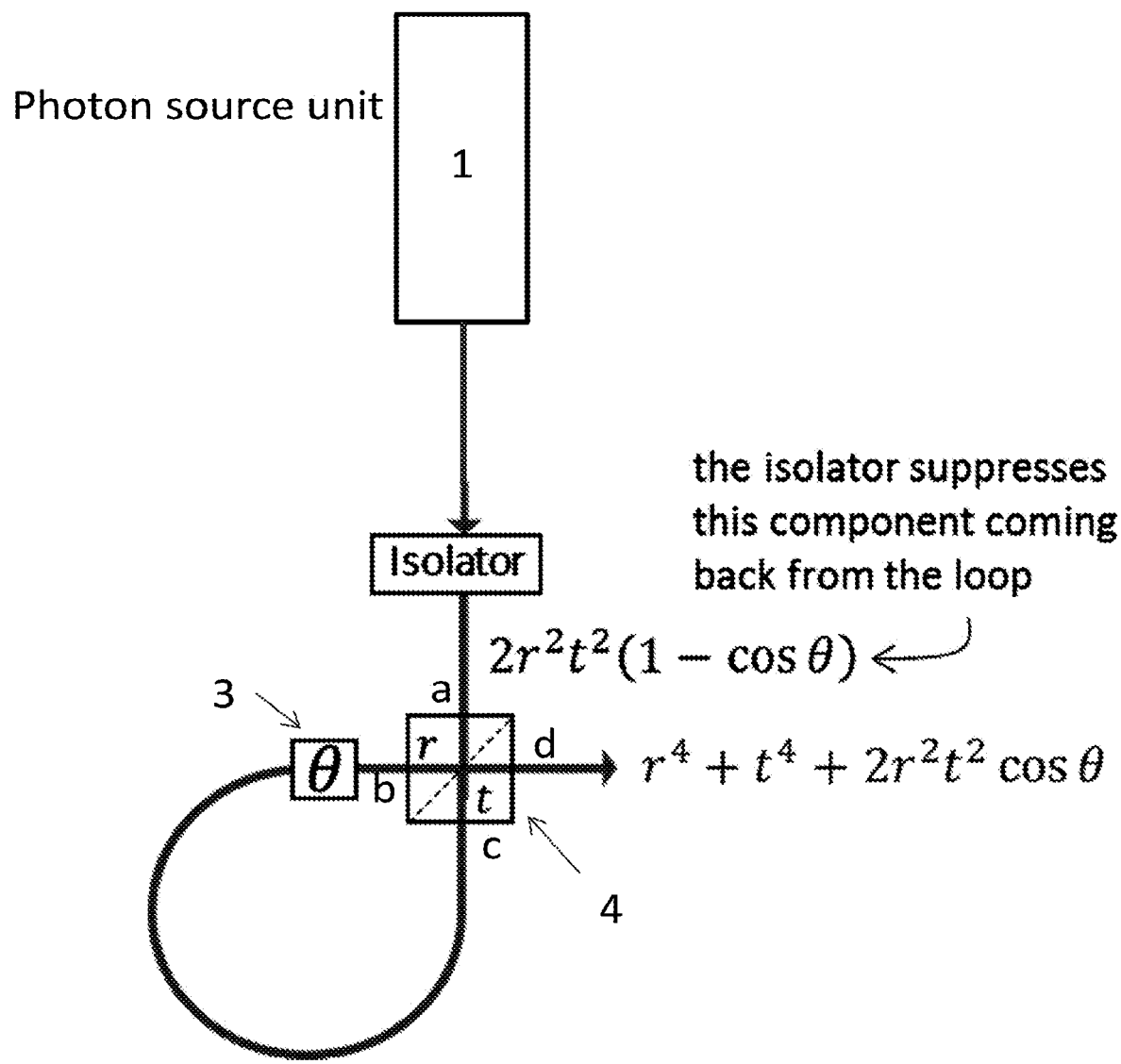
FIG. 9 shows an example of a transmitter for a quantum communication system, where the intensity modulator uses a Sagnac interferometer design.

FIG. 9 shows an example of a transmitter for a quantum communication system. The transmitter of FIG. 9 is the same as the transmitter of FIG. 4(a), except that a single asymmetric element 4 is used as both the input element and the output element and the intensity modulator uses a Sagnac interferometer design. Description of the elements already described in relation to FIG. 4(a) will be omitted.

The first intensity modulator is configured to receive an input light pulse from the photon source unit 1. The first intensity modulator comprises an element 4, which is an asymmetric beam splitter, which is both the input and output element (i.e. the first element also forms the second element).

The beam splitter 4 comprises four ports labelled a, b, c and d. A first "input" port a is coupled to the photon source unit 1. The second and third ports b and c are coupled to each other by a waveguide. A light pulse entering the first "input" port a is split between the second and third ports b and c into two light pulses, which travel along the waveguide in opposite directions. The beam splitter 4 thus splits the input light pulse into two components, one which exits through the second port b and one which exits through the third port c. A phase modulator 3 located in the waveguide is configured to apply a phase shift between the two components. The phase modulator 3 may be placed in a position within the loop so that a phase shift may be applied at a point in time when one of the components passes through the phase modulator 3, but not when the other component passes through. In particular, it may be placed far enough from the mid-point that switching of the phase shifts between the components is possible.

Since beam splitter 4 is an asymmetric beam splitter, when a single multi-photon light pulse is input into the first port a of the beam splitter 4, the intensity of a first component (output through the second port b) is not equal to the intensity of a second component (output through the third port c). The beam splitter 4 thus has a splitting ratio other than 1, where the splitting ratio is the ratio of the component output through the second port b to the component output through the third port c.

The component output from the second port b is inputted into the third port c and the component outputted from the third port c is inputted into the second port b of the beam splitter 4. The two components thus re-combine at the beam splitter 4 and interfere, resulting in a light pulse exiting the first "input" port a and a light pulse exiting the fourth port d. Since beam splitter 4 is an asymmetric beam splitter, when a single multi-photon light pulse is input into one of the second and third ports b and c of the beam splitter 4, the intensity of a first component (output through the first port a) is not equal to the intensity of a second component (output through the fourth port d). The beam splitter 4 thus has a splitting ratio other than 1, where the splitting ratio is the ratio of the component output through the first port a to the component output through the fourth port d. This is the same as the splitting ratio discussed above (i.e. the ratio of the component output through the second port b to the component output through the third port c).

The beam splitter 4 has reflection and transmission coefficients r, t≤1, where $r^2+t^2=1$, and r≠t. The beam splitter thus has a splitting ratio other than 1. For example, r≠0 and t≠0, i.e. the beam splitter is a partially asymmetric beam splitter. In this case, both the input element and output element are asymmetric, and are a single element. The transmitter shown in FIG. 9 uses a single beam splitter 4 with a fixed and asymmetric splitting ratio, for example, $r^2=0.75$ and $t^2=0.25$.

The intensity modulator thus comprises the waveguide, comprising the phase modulator 3, and the beam splitter 4. The phase modulation corresponds to a modulation in the intensities outputted by the beam splitter 4. The transmission curves will be the same as those shown in FIG. 4(b). The output intensity at the fourth port d of the intensity modulator corresponds to the intensity of the light pulse inputted to the intensity modulator multiplied by $r^4+t^4+2r^2t^2 \cos\theta$, and the output intensity at the first "input" port a corresponds to the intensity of the light pulse inputted multiplied by $2r^2t^2(1-\cos\theta)$. The transmission coefficients of the two output ports of the intensity modulator are therefore $r^4+t^4+2r^2t^2\cos\theta$ and $2r^2t^2(1-\cos\theta)$ respectively.

The extinction ratio depends on the values of r and t. For the fourth output d the extinction ratio is:

$$ER=2r^2t^2/(r^4+t^4)$$

To obtain an ER=0.5 (3 dB), r=0.888 and t=0.46 or r=0.46 and t=0.888.

The pulses output from the first input port a are not used in this case. An isolator is included between the first input port a and the photon source unit 1, to prevent light outputted from the first input a travelling back up the waveguide to the photon source unit 1. The isolator is used to suppress the light coming back from the waveguide loop.

This design allows any phase drift may be compensated for even when implemented using bulk optics. Thus the system may be implemented using optical fibres, and the design of the interferometer compensates for any phase drift. The transmission from the fourth port d of the Sagnac interferometer in FIG. 9 is equal to the transmission from the first output r of the MZI in FIG. 4(*a*). The Sagnac automatically and passively compensates for any DC phase drift, which may be caused either due to the phase modulator driving signal or to a temperature variation for example.

Figure 10:
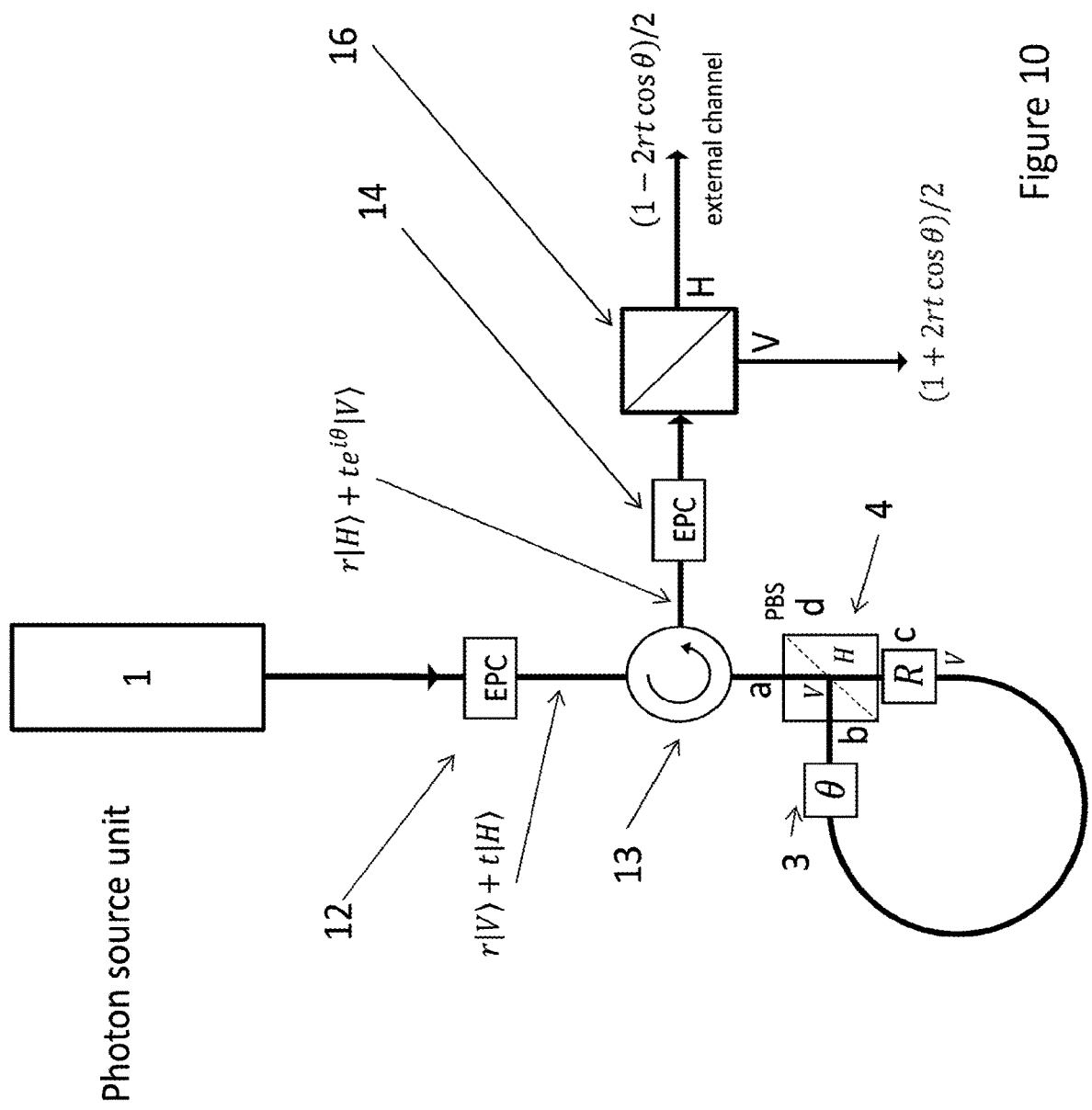
FIG. 10 shows another example of a transmitter for a quantum communication system using polarisation components.

A similar interferometer design based on polarization is shown in FIG. 10. FIG. 10 shows another example of a transmitter for a quantum communication system. The transmitter of FIG. 10 is similar to the transmitter of FIG. 9, except that a first electronic polarisation controller (EPC) 12 together with a first symmetric polarising beam splitter 4 is used as the asymmetric input element, and the first symmetric polarising beam splitter 4 together with a second EPC 14 and a second symmetric polarising beam splitter 16 forms a symmetric output element. The intensity modulator again uses a Sagnac interferometer design. Description of the elements already described in relation to FIG. 9 will be omitted. In this case, a part (the first polarising beam splitter 4) of the input element (comprising a first EPC 12 and the first polarising beam splitter 4) also forms a part of the output element (the first polarising beam splitter 4, second EPC 14 and second polarising beam splitter 16). The extinction ratio of the intensity modulator may be varied by adjusting the first EPC. In this system, all of the fibres used after the first EPC 12 are polarisation maintaining fibres.

The first intensity modulator is configured to receive an input light pulse from the photon source unit 1. The first intensity modulator comprises an input element, which comprises a first EPC 12 and a first symmetric polarising beam splitter 4.

The first beam splitter 4 comprises four ports labelled a, b, c and d. A first "input" port a is coupled to the photon source unit 1, via the first EPC 12 and an optical circulator 13. The photon source unit 1 outputs a light pulse to the first EPC 12. The circulator is located between the first EPC 12 and the beam splitter 4. Using the first Electronic Polarization Control (EPC) 12, it is possible to control the input polarization on the polarising beam splitter 4. The first EPC and the first polarising beam splitter act in a similar manner as the asymmetric beam splitter 4 in FIG. 9. However, the coefficients r and t are now variable, as they depend on the input polarization set by the first EPC 12. The first EPC 12 and the first polarising beam splitter 4 together form an asymmetric input element.

The second and third ports b and c are again coupled to each other by a waveguide. A light pulse entering the first "input" port a is split between the second and third ports b and c into two light pulses, which travel along the waveguide in opposite directions. The relative intensity of the two light pulses depends on the input polarisation (set by the first EPC 12). The first polarizing beam splitter 4 thus splits the input light pulse into two components, a fraction $r^2$ in the vertical polarisation component |V> which exits through the second port b and a fraction $t^2$ in the horizontal polarisation component |H> which exits through the third port c, where r and t are set by the first EPC 12.

At the third output c of the PBS 4 (i.e. through which the horizontal component exits) a polarization rotator R is located in the waveguide. This component changes the Horizontal polarization component exiting the third port c into Vertical polarisation. By doing this, the pulses travelling in opposite directions in the waveguide loop experience the same birefringence and the Sagnac interferometer is stable. The rotator R may not be implemented as a separate component, rather the polarization-maintaining fibre coupled to the PBS 4 at port c can be rotated by 90 degrees for example. Alternatively, both the second and third ports b and c of the first PBS 4 are coupled to the slow axis of the polarization-maintaining fibre of the Sagnac loop and a separate rotation component is included. The vertical polarisation component which exited the second port b is also rotated into horizontal polarisation when it reaches the rotator R, before entering the third port c. Thus both components re-combine and interfere at the beam splitter 4, and emerge from the same input port of the PBS 4 which they entered (first port a). The fourth port d is not used in this implementation. The circulator 13 directs the pulses emerging from the first output a of the first PBS 4 to a second EPC 14.

The phase modulator 3 located in the waveguide is configured to apply a phase shift between the two components. The phase modulator 3 may be placed in a position within the loop so that a phase shift may be applied at a point in time when one of the components passes through the phase modulator 3, but not when the other component passes through. In particular, it may be placed far enough from the mid-point that switching of the phase shifts between the components is possible.

The first EPC 12 thus sets the polarisation of the light output from the photon source 1. Although a fixed polarisation controller could be used, an EPC may be adjusted to compensate for any polarization drift (e.g. due to thermal stress in the fibre for example). The circulator 13 transfers the light input through the port connected to the first EPC 12 to the port connected to the first port 1 of the beam splitter 4. The first EPC 12 sets a polarisation state r|V>+t|H>, where r≠t, with r=cos $\varphi$ and t=sin $\varphi$ and $\varphi$ being the polarization angle set by the EPC 12 relative to the axis of the PBS 4. For example, r≠0 and t≠0, i.e. partially asymmetric. When a light pulse in the state r|V>+t|H> where r t is input into the first port a of the first beam splitter 4, the intensity of a first vertical polarisation component (output through the second port b) is not equal to the intensity of a second horizontal polarisation component (output through the third port c). The first element, comprising the beam splitter 4 and the EPC 12 is thus configured with a splitting ratio other than 1, where the splitting ratio is the ratio of the component output through the second port b (vertical polarisation) to the component output through the third port c (horizontal polarisation).

The component output from the second port b is inputted into the third port c and the component outputted from the third port c is inputted into the second port b of the beam splitter 4. The components re-combine and interfere in the beam splitter 4, which outputs the resulting pulse through the first port a.

To produce the same transmission curve as the first output r in FIG. 3(*b*), the first EPC 12 may be set to input a state r|V>+t|H>, with r=cos φ and t=sin φ, where r≠t and φ is the polarization angle set by the first EPC 12 relative to the axis of the first PBS 4 (being a different parameter to e, the phase angle encoded on the optical pulses by the phase modulator 3 inside the loop). For example, r≠0 and t≠0, i.e. partially asymmetric.

The intensity modulator thus comprises the first EPC 12, circulator 13, optical fibre loop comprising the phase modulator 3, the first polarising beam splitter 4, second EPC 14 and second polarising beam splitter 16. The phase modulation corresponds to a modulation in the intensities outputted by the beam splitter 4. For example, if the state r|V>+t|H> is inputted to the first beam splitter 4, it splits the two polarisation modes into the output ports b (polarisation V) and c (polarisation H). Then, if the phase modulator 3 in the Sagnac loop is "off" when the pulse from the second port b passes through it and "on" when the pulse from the third port c passes through it, the output light from the first port a will be r|H>+te$^{i\theta}$|V>, where θ is the phase applied by the phase modulator. The circulator 13 then directs the output light from the first port a to the second polarisation controller EPC 14.

The second polarization controller EPC 14 is included to control the polarization drift in time and is aligned to a second polarising beam splitter 16 such that if a polarization (|V>+|H>)/√2 enters the controller EPC 14, all the light will emerge from the V output port of the second symmetric polarising beam splitter 16, in other words the second EPC 14 and the second splitter 16 together form a symmetric element. The second polarisation controller EPC 14 is set to put the V component output from the circulator 13 into the state D and the H component output from the circulator 13 into the state A, where D=(V+H)/√2 and A=(V−H)/√2. The second polarising beam splitter 46 outputs the resulting horizontal component through one port with an intensity (1−2rt cos θ)/2 and the resulting vertical component through the other port with an intensity (1+2rt cos θ)/2. In this configuration, the transmission curves will be the same as those shown in FIG. 3(*b*) (i.e. corresponding to one symmetric element (output in this case) and one asymmetric element (input in this case).

Figure 11:
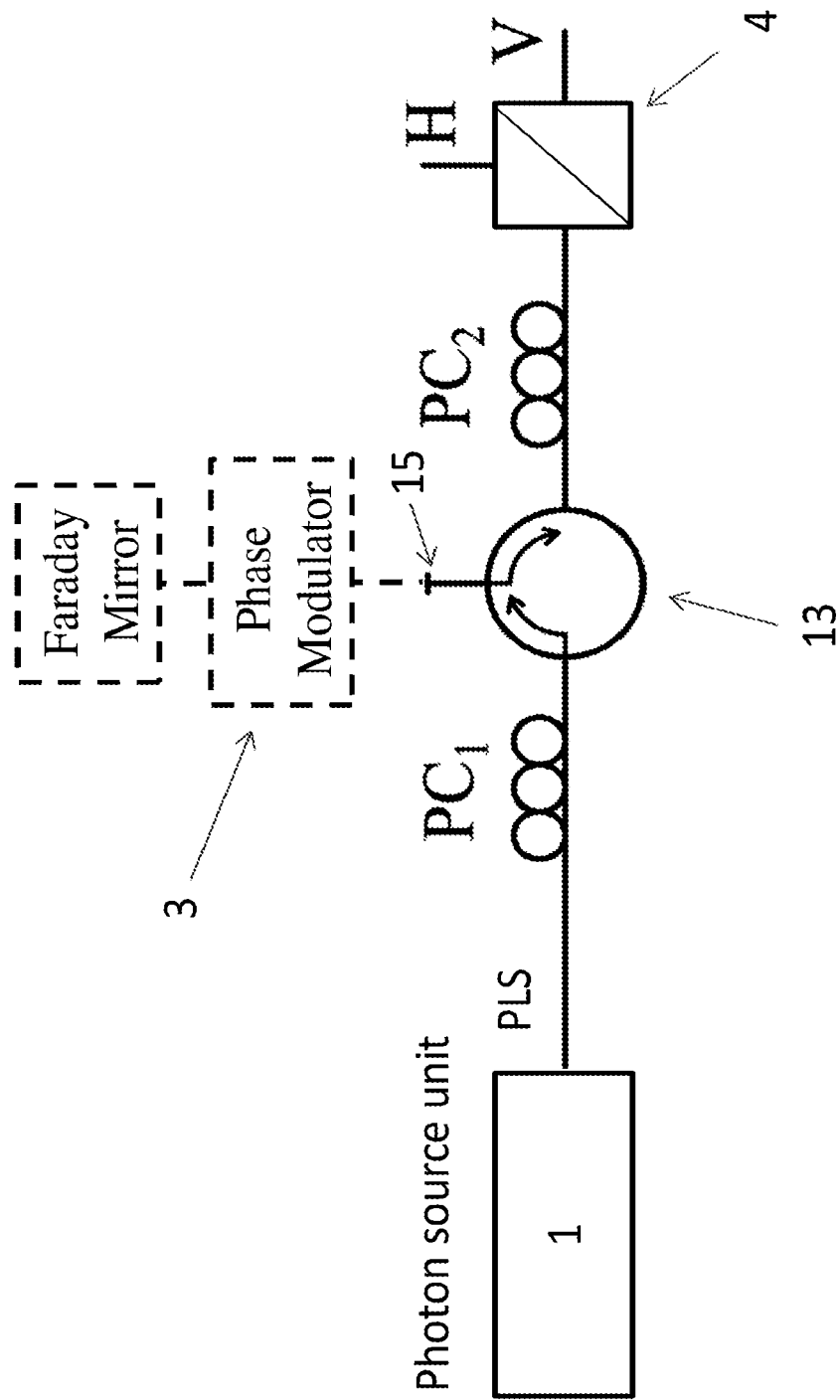
FIG. 11 shows another example of a transmitter for a quantum communication system using polarisation components.

FIG. 11 shows another example of a transmitter for a quantum communication system. Again, description of the elements already described in relation to the previous figures will be omitted. In this case, the first element comprises a first polarisation controller PC$_1$ and a fibre interface 15 and the second element comprises the fibre interface 15, a second polarisation controller PC$_2$ and a symmetric polarising beam splitter 4. A part (the fibre interface 15) of the input element (comprising the first polarisation controller PC1 and the fibre interface 15) also forms a part (the fibre interface 15) of the output element (the fibre interface 15, the second polarisation controller PC$_2$ and the symmetric polarising beam splitter 4). The input element is asymmetric and the output element is symmetric, as will be described below. The transmitter functions in a similar manner to the transmitter shown in FIG. 10.

The transmitter comprises the photon source unit 1 comprising a photon source. The transmitter further comprises a first intensity modulator, configured to receive an input light pulse from the photon source unit 1. The first intensity modulator comprises a folded polarization-based Michelson interferometer.

The first intensity modulator comprises the first element, comprising the first polarisation controller PC$_1$ and the fibre interface 15. The first polarisation controller PC$_1$ is coupled to the photon source unit 1 and receives a light pulse output from the photon source unit 1. The first polarisation controller PC$_1$ is coupled to an optical circulator 13, which directs a light pulse input from the first polarisation controller PC$_1$ to an output comprising the fibre interface 15. The first polarisation controller PC$_1$ may be an electronic polarisation controller such as described in relation to FIG. 10 for example.

The interferometer works in a similar to an MZI (described in relation to FIG. 3 for example), with the addition that the phase difference between pulses translates into a polarisation rotation. The components along the horizontal direction, depicted in dashed lines, are based on single mode fibres, whereas those in the vertical direction, depicted in fainter lines, are based on polarization-maintaining fibres. Thus the connections between the circulator 13 and the photon source unit and between the circulator 13 and the beam splitter 4 are through single mode fibres. The fibre interface 15 is an interface between the single mode fibre and a polarization maintaining fibre.

The first polarisation controller PC$_1$ thus sets the polarisation of the light output from the photon source 1. The circulator 13 transfers the light input through the port connected to the PC$_1$ to the port connected to the fibre interface 15. The first polarisation controller PC$_1$ aligns the incoming pulses at an angle φ with respect to the polarization maintaining fibre slow axis, thus preparing the same input state r|V>+t|H>=cos φ|V>+sin φ|H>, where r≠t (i.e. φ≠45°) as the EPC 12 in FIG. 10. For example, r≠0 and t≠0, i.e. partially asymmetric. Thus φ is the same as the polarization angle used in FIG. 10, and determines the asymmetry between r and t. At the fibre interface 15, the optical input pulse r|V>+t|H> is split in two components, a fraction r$^2$ in the vertical polarisation component |V> and a fraction t$^2$ in the horizontal polarisation component |H>, both of which travel along the same polarisation maintaining fibre. The two components have unequal intensity, depending on the values of r and t.

Thus the relative intensity of the two components depends on the input polarisation (set by the first polarization controller PC$_1$). The components travel along the slow and fast axes of the polarisation maintaining fibre respectively. Thus when a single multi-photon light pulse in the state r|V>+t|H> is input into the fibre interface 15, the intensity of a first vertical polarisation component (output into the polarisation maintaining fibre) is not equal to the intensity of a second horizontal polarisation component (also output into the polarisation maintaining fibre). The first element, comprising the first polarisation controller and the fibre interface 15 is thus configured with a splitting ratio other than 1, where the splitting ratio is the ratio of the vertical polarisation component to horizontal polarisation component. The first polarisation controller controls the input polarization on the fibre interface 15, which then acts in the same way as the polarising beam splitter in FIG. 10.

The using the first polarization controller PC$_1$, it is possible to control the input polarization on the fibre interface 15. The first polarization controller PC$_1$ and the fibre interface 15 act in the same manner as the EPC 12 and the polarising beam splitter 4 in FIG. 10. The coefficients r and t depend on the input polarization set by the first polarization controller PC$_1$. The first polarization controller PC$_1$ and the fibre interface 15 together form an asymmetric input element. The first element is configured to split an input light pulse into two components, both of which exit the fibre interface 15 into the same fibre.

The polarisation maintaining fibre runs from the fibre interface 15 to one or more phase modulators 3, in this case a single phase modulator, but which can alternatively be realised with two phase modulators coupled in series for example. The phase modulator 3 may be configured to apply a phase shift based on the polarisation of the light (for example the phase modulator 3 may apply a phase shift between a vertical polarisation component and a horizontal polarisation component travelling through the phase modulator). The pulses travel along the slow and fast axes of the polarisation maintaining fibre and of the phase modulator 3. The phase difference θ between the two orthogonal polarizations V and H is controlled by the voltage applied at the one or more phase modulators 3. A Faraday mirror is located after the phase modulator 3 and reflects the light pulses back along the polarisation maintaining fibre to the phase modulator 3, whilst flipping the polarization of the components to their orthogonal correspondent. Thus the Faraday mirror flips the polarisation of the vertical polarisation component to horizontal, and the polarisation of the horizontal polarisation to vertical. The total optical path is therefore equal for the two polarization components, removing any effects of polarization mode dispersion due to the polarization-maintaining components, which could limit the interference visibility.

The timing of the phase shift pattern and the optical length between the phase modulators 3 and the mirror are tuned to avoid applying equivalent phase shifts on the two components (which would be equivalent to compensating the phase modulation after the pulses travel back along the fibre, thus causing the visibility to be zero). The phase modulator 3 is thus configured to apply a phase shift between the two polarisation components. The timing is set so that no phase shift is applied to either component on the return trip.

The two components then interfere at the interface 15 between polarization-maintaining fibre and single-mode fibre, and the phase difference θ between them set by the phase modulator 3 translates into an equivalent polarization rotation. The first intensity modulator comprises a second element (also referred to as the output element), which comprises the fibre interface 15, the second polarisation controller PC$_2$ and the symmetric polarising beam splitter 4 and is configured to interfere the two components.

The optical circulator 13 directs light pulses from the fibre interface 15 to the second polarisation controller PC$_2$, which is coupled to the polarising beam splitter 4 via a single mode fibre. Thus the circulator 13 is used to extract the reflected pulses, which are then projected on the polarising beam splitter 4. The second polarization controller PC$_2$ is used to control the polarization drift in time. It is aligned to the symmetric polarising beam splitter 4 such that if a polarization (|V>+|H>)/√2 enters the controller PC$_2$, all the light will emerge from the V output port of the symmetric polarising beam splitter 4. The symmetric polarising beam splitter 4 has two output ports, one which outputs a horizontal polarisation component (H) and one which outputs a vertical polarisation component (V) of the input light pulse. The relative intensity of the output horizontal polarisation component and the vertical polarisation component depends on the polarisation rotation of the input light pulse (in turn determined by the phase modulation and the polarisation applied by the first polarisation controller PC$_1$). The relative intensity of light emerging each of the output ports of the polarising beam splitter 4 depends on r and t, and is equivalent to the curves depicted in FIG. 3(b). The system acts in the same manner as the system shown in FIG. 10.

The polarization-maintaining fibre interface 15 effectively acts as a polarizing beam splitter. It defines two components, or "modes", one aligned with the polarisation maintaining fibre's slow axis and one with the fast axis, having different intensities whenever the input angle (set by the first polarisation controller) is different from 45 degrees.

The intensity modulator thus comprises the first polarisation controller, circulator 13, waveguides and interface 15, phase modulator(s) 3, Faraday mirror, second polarisation controller and the beam splitter 4. The phase modulation corresponds to a modulation in the intensities outputted by the beam splitter 4. The transmission curves will be the same as those shown in FIG. 3(b).

Figure 12:
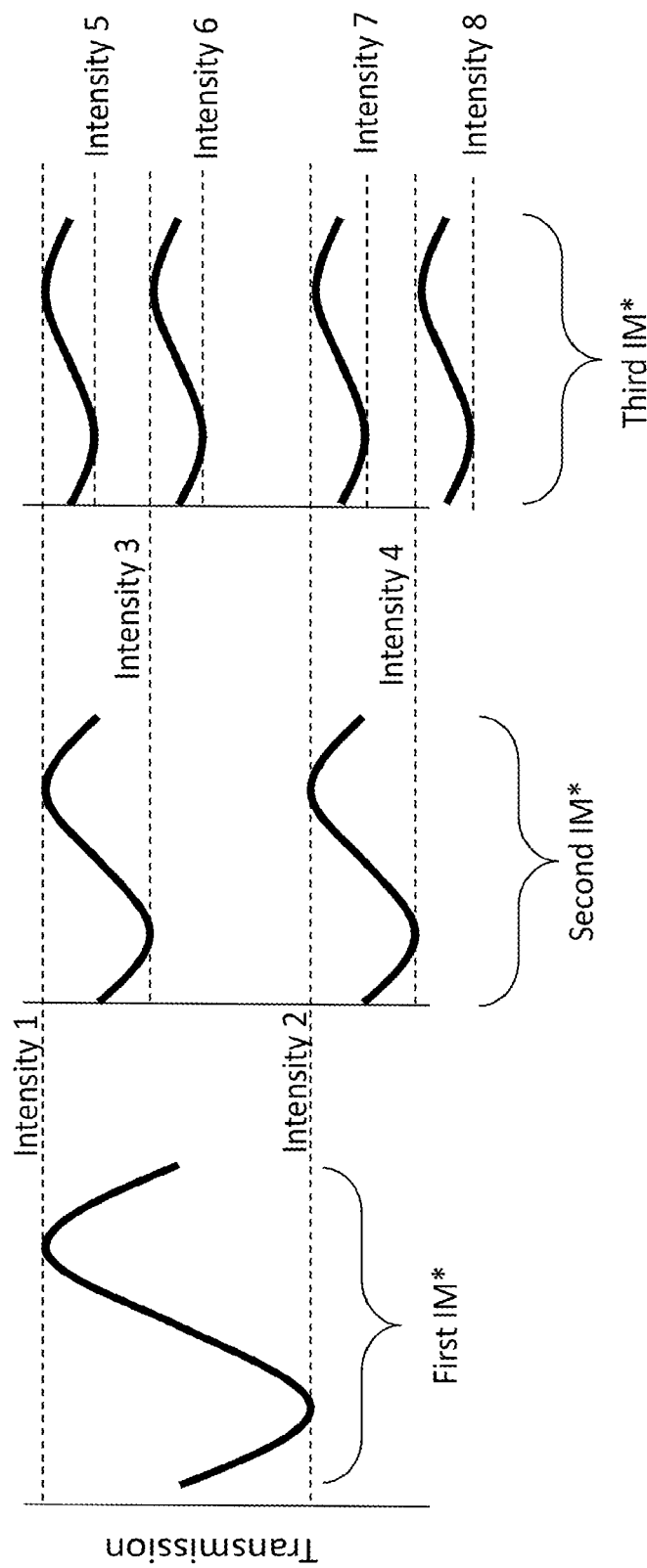
FIG. 12 is a schematic illustration showing how further intensity levels may be generated by using multiple intensity modulators coupled together.

FIG. 12 is a schematic illustration showing how further intensity levels may be generated by using multiple intensity modulators coupled together. The figure shows the intensity levels generated by a series of intensity modulators. In the illustrated case, each intensity modulator corresponds to the intensity modulator described in relation to FIG. 4(a). The output is taken from the "r" output, therefore the transmission curve of each intensity modulator corresponds to the dashed line in FIG. 4(b).

The first intensity modulator has a transmission given by the curve on the left hand side (labelled "First IM*"). The maximum and the minimum transmission values correspond to two intensity levels (intensity 1 and 2).

A second intensity modulator ("Second IM*") is coupled to the "r" output of the first one, meaning that the maximum transmitted intensity from the first intensity modulator "intensity 1" is either transmitted entirely (when the second intensity modulator has maximum transmission or zero attenuation) or attenuated to the level of intensity 3 (when the second intensity modulator has maximum attenuation or minimum transmission). The intensity 2 from the first intensity modulator can be either entirely transmitted through the second intensity modulator (when it has zero attenuation) or attenuated to the level of intensity 4 (when it has maximum attenuation). Thus the second intensity modulator outputs light pulses having intensity 1 (both maximum transmission), intensity 3 (maximum transmission+minimum transmission), intensity 2 (minimum transmission+maximum transmission) and intensity 4 (minimum transmission+minimum transmission).

This mechanism is repeated with a third intensity modulator (Third IM*), resulting in eight stable intensities from three intensity modulators. The intensities are stable since they are generated using maximum or minimum transmission curve points. In general, $2^n$ intensity levels can be generated from n intensity modulators coupled in series.

Figure 13:
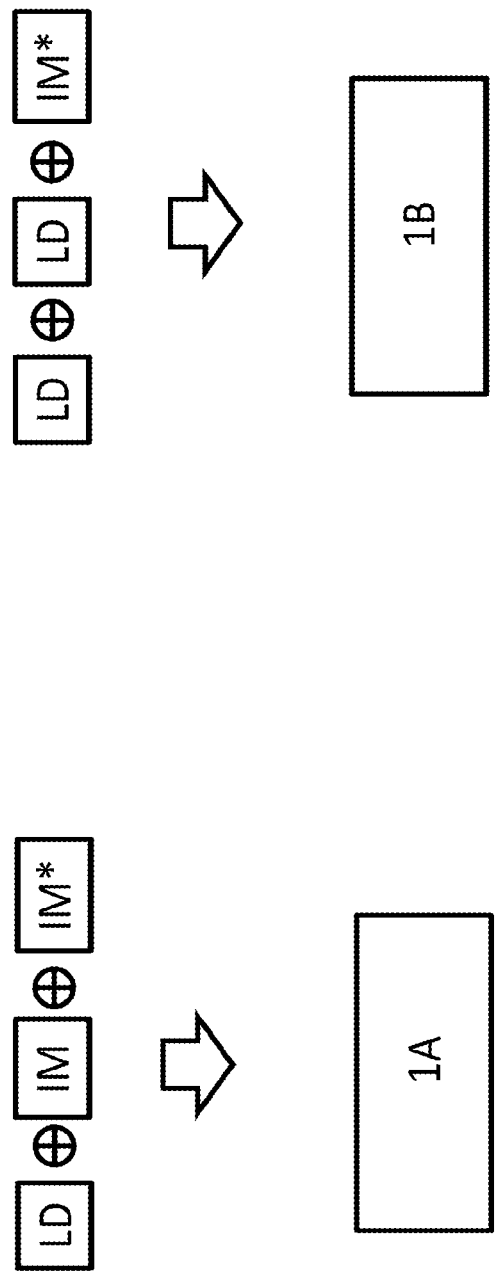
FIG. 13 shows two transmitter units used in the following figures.

FIG. 13 shows two transmitter units, 1A and 1B which are used in the following figures. Unit 1A corresponds to that described in relation to FIG. 5(a) and unit 1B corresponds to that described in relation to FIG. 5(b).

Figure 14:
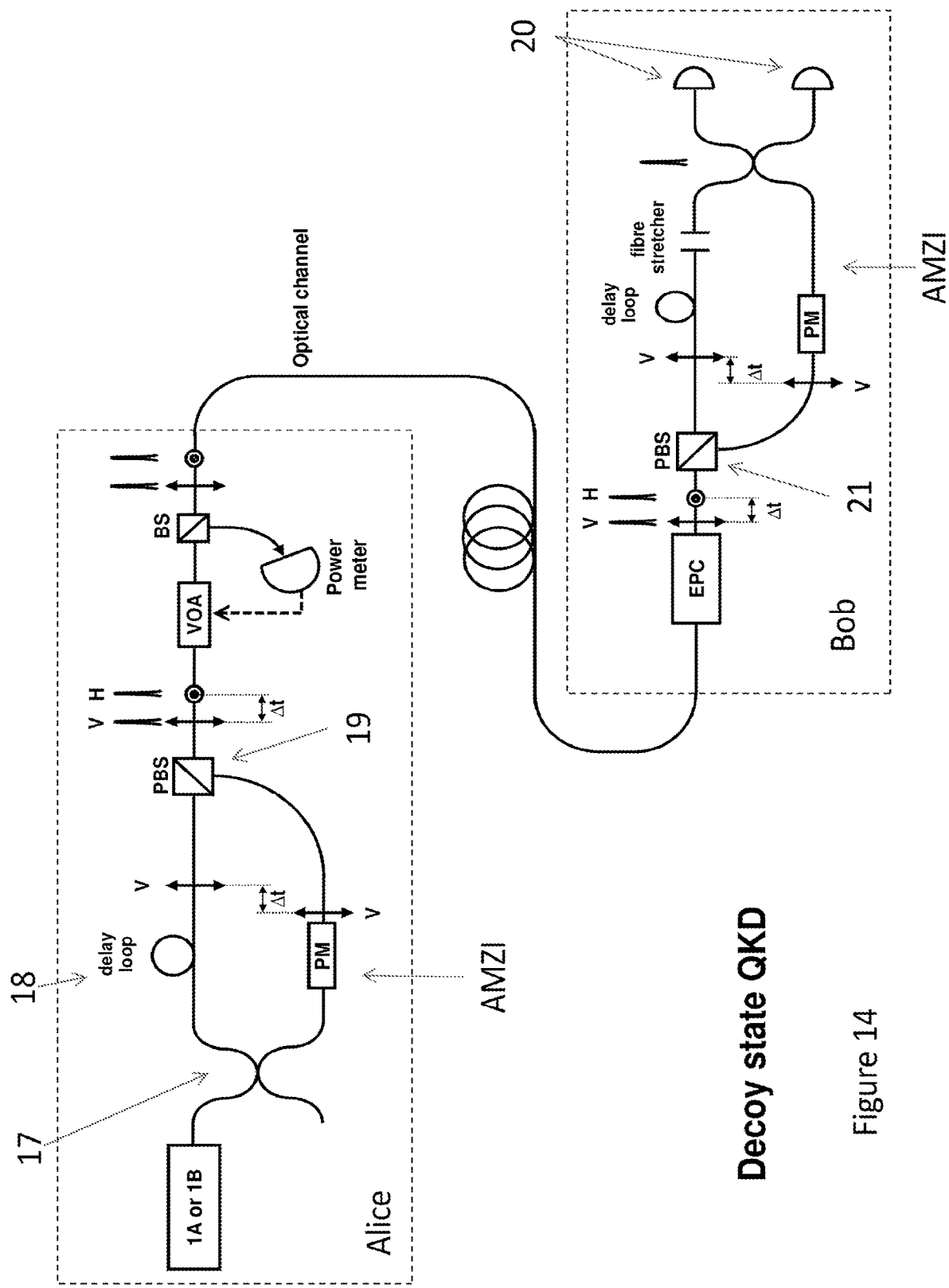
FIG. 14 shows a schematic illustration of a quantum communication system which is adapted to encode and decode optical pulses for quantum key distribution using a decoy state protocol.

FIG. 14 is a schematic illustration of a quantum communication system which is adapted to encode and decode optical pulses for quantum key distribution (QKD), using a decoy state protocol.

The transmitter (Alice) comprises an element 1A or 1B that generates light pulses modulated in intensity as explained in relation to the previous figures.

The pulses are linearly polarized so the light travels along the slow axis of polarization maintaining fibre in the transmitter. The fibre fast axis could be equivalently chosen.

The light pulses enter an asymmetric Mach-Zehnder interferometer (AMZI) which, in this case, functions as a phase encoder for encoding random (key) information. The AMZI comprises polarization maintaining fibre. The light pulses entering the AMZI enter a coupler 17 that splits an incoming light pulse into two paths. In this example, the first path comprises a longer arm of the interferometer using an optical delay loop 18. The second, shorter path comprises a phase modulator (PM). The phase modulator PM is used to encode random (key) information onto the light pulses. Due to the variation in the length of the arms, a light pulse that follows the short path and a light pulse that follows the long path have a temporal separation Δt. In an example, this temporal separation may be set to half the inverse clock rate of the QKD system.

The pulses are then combined at a polarizing beam splitter (PBS) 19. The PBS 19 has the property that the polarization of one of the input arms is rotated by 90 degrees. This results in an output which has a polarization that can be decomposed into two orthogonal polarizations V and H, separated by a time Δt. The pulses are then attenuated to the single photon level using a variable optical attenuator (VOA) resulting in pulses with an average intensity of less than one photon per pulse. Before being emitted from the transmitter into the optical channel, part of the pulses may be directed from a calibrated beam splitter BS to a power meter, which measures their intensity level. The output signal from the power meter is processed and a feedback signal is sent to the VOA to adjust and keep stable the correct average intensity desired for the application.

All the optical components in the transmitter may be controlled using an electronic controller (not shown).

The optical pulses travel down the optical channel which could be an optical fibre for example. The pulses then enter the receiver (Bob), which comprises another AMZI, matched with the AMZI in the transmitter (i.e. with the same time difference Δt) which in this case functions as a decoder. A pair of single photon detectors, for example avalanche photodiodes are included, one at each output of the AMZI. A light pulse, on entering the receiver, first enters an electronic polarization controller (EPC) before travelling through a polarising beam splitter (PBS) 21. The EPC is adjusted such that it corrects any polarization rotation that occurred during transmission over the optical channel. This results in two orthogonal polarizations V and H for pulses impinging onto the PBS 21. The PBS directs the light pulses either into the long arm or the short arm of the AMZI containing the phase modulator, depending on the input polarization of the light pulses. The PM is used in decoding the random (key) information on the light pulses. As for the PBS 19 in the transmitter, the PBS in the receiver has the property that one of the output arms polarization is rotated by 90 degrees. Consequently both output pulses have the same polarization, V in this case.

With the correct input polarization, the first (in time) light pulse travels down the long arm of the receiver AMZI and the second (in time) light pulse travels down the short arm of the receiver AMZI. In this way, the delay loop in the receiver cancels out the time difference Δt between the two optical pulses and optical interference results at the final beam splitter due to complete overlap of the two light pulses. After that, the resulting optical pulse is detected by the final detectors 20. The overlap of the two pulses at the interfering beam splitter can be quantified by the system's visibility (Vis) which is related to the QKD system quantum bit error rate (QBER) by QBER=(1−Vis)/2.

Fine tuning of the interference may be performed by adjusting the phase of the light pulse in the long arm using the fibre stretcher. This compensates small (phase) changes in the interferometers due to thermal drifts. The fibre stretcher is an electrically operated device. Several coils of fibre are wound around a piezoelectric stage. By applying a voltage to the stage, the fibre can be stretched thereby imparting an optical delay on light travelling through the fibre. The response time of a fibre stretcher is usually very quick ~1 kHz, making it suitable for correcting small and fast delay (phase) changes. In some examples, the maximum amount of stretch gives <1 ps of delay, although some fibre stretchers can tolerate extremely high voltages+/−400V which give several picoseconds of delay. However, these high voltage fibre stretchers can be bulky and may require high voltage equipment to operate them.

Optical components in the receiver may be controlled using an electronic controller (not shown). The controller also samples the resulting electrical signals from single photon detectors when light pulses are detected.

To apply the decoy-state protocol, the transmitter (Alice) prepares coherent pulses with multiple (i.e. more than one) intensities. The following description relates to a protocol using three intensity levels: u (signal), v (decoy) and w (vacuum). However, as has been explained above, a decoy state protocol may be implemented with two or more intensity levels. In the following, the intensity levels are chosen such that u>v>w, and in particular the values may be chosen to be in the order of u~0.5, v~0.1 and w<$10^{-3}$ for example. Alternatively, v~0.125.

The preparation of u, v and w occurs at random, with probabilities $p_u$, $p_v$ and $p_w$, respectively, decided by Alice. The pulses with these intensities are then encoded by Alice using the phase modulator PM and then sent to the receiver (Bob), who will apply a further phase with his phase modulator PM and then make a measurement with the detectors 20. The encoding and decoding operations apply information about the "basis" (Z or X) and "bit" (0 or 1) on the optical pulses, which is used to distil the final cryptographic key.

After many pulses have been sent by Alice and measured by Bob, the transmission of the quantum signals stops and the users start communicating on a public authenticated channel to reconcile their data and distil a key that is known to them only (secret key). To reconcile their data, Bob will announce which events generated counts in his detectors. All the events that did not generate counts in Bob's detectors are discarded by the users Alice and Bob. For the remaining events, the users will announce the basis (Z or X) chosen in their encoding and decoding operations. All the events where the bases are different will be discarded.

For the remaining events, Alice will announce the intensity u, v or w chosen during the preparation stage. The users will then group all the data according to the intensity and basis, ending up with data in the basis Z and intensity u, v or w and data in the basis X and intensity u, v or w. Based on this grouping, the users will perform an estimation of the detection probability (gain) and of the level of noise (Quantum Bit Error Rate, or QBER) in each group. This step informs performance of the subsequent post-processing of the data in order to distil the secret key, according to the decoy state QKD protocol.

The better the decoy-state estimation step, the higher the final key rate. To perform a good estimation, the total counts detected by Bob should be well distributed among the various data subsets. It is especially important that the groups related to the main basis, e.g. Z, and to the signal (u)

and decoy (v) states are well populated, to improve the statistical analysis of the sample. If the data sample is too small, the statistical fluctuations may spoil the estimation step and the key rate becomes poor.

To populate the data sets with signal and decoy states, it is necessary to increase the intensities u and v as much as possible, to increase the chances that Bob's detectors will click. However, increasing the intensity too much violates the security condition of QKD. The intensity used should thus balance these two competing requirements. For example, intensity levels of u~0.5 and v~0.1 may balance these two requirements. This corresponds to a factor of 5× intensity difference between the signal and decoy states.

Figure 15:
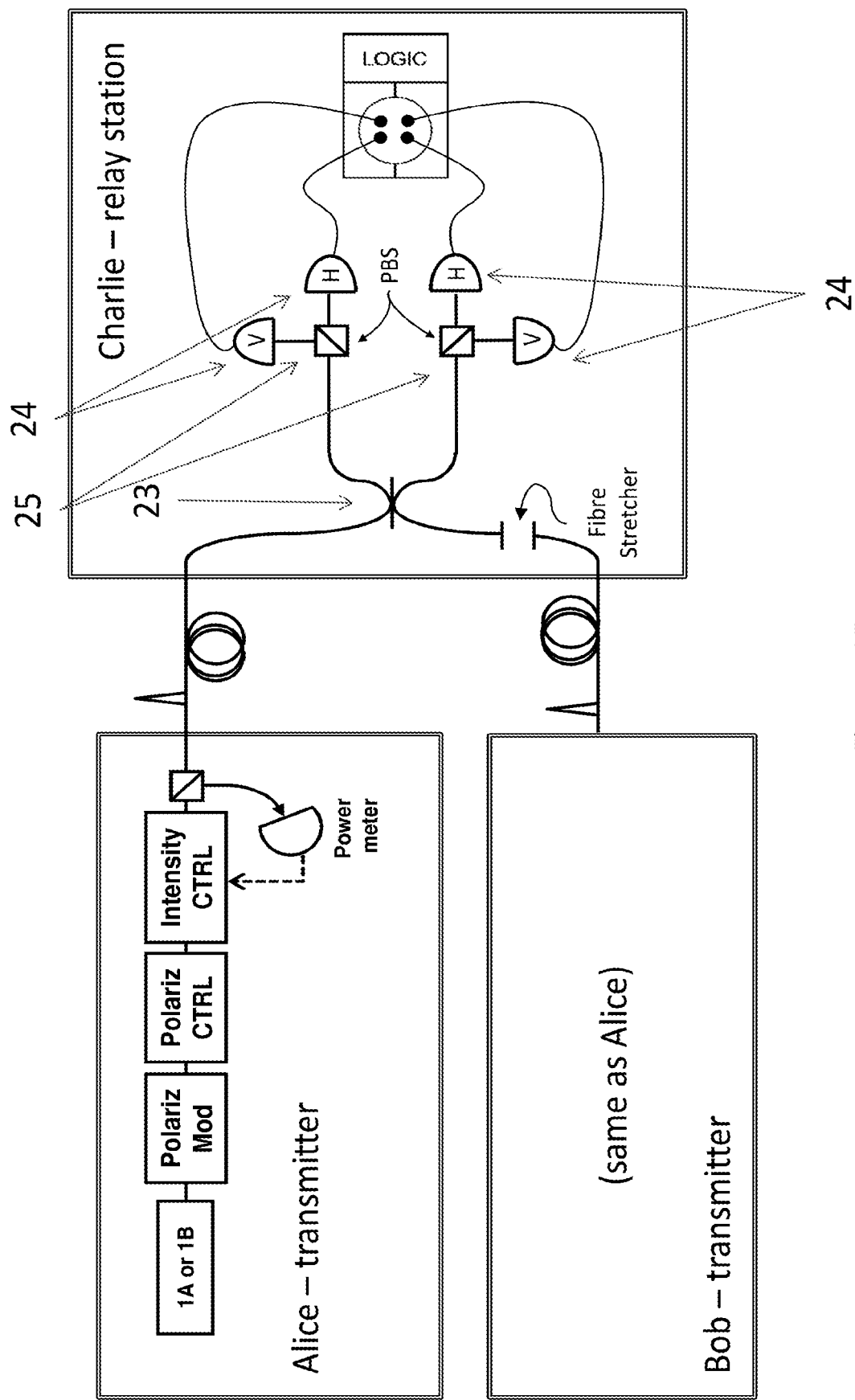
FIG. 15 shows a schematic illustration of a quantum communication system which is adapted to encode and decode optical pulses for a measurement device independent quantum key distribution (QKD), using a decoy state protocol.

FIG. 15 is a schematic illustration of a quantum communication system which is adapted to encode and decode optical pulses for a measurement device independent quantum key distribution (QKD), using a decoy state protocol. FIG. 15 contains a fibre-based polarization-based implementation of a measurement-device-independent (MDI) QKD decoy state protocol.

In the figure, elements designated as modulators (Mod) are "fast" devices, i.e. working at rates around GHz, while the control devices (CTRL) are slower, used for alignment based on a feedback signal.

The transmitter "Alice" comprises an element 1A or 1B that generates light pulses modulated in intensity as explained in relation to the previous figures. The pulses are emitted from the element 1A or 1B as linearly polarized in the polarization V. The light pulses pass through a polarization modulator, which encodes them with the random (key) information. For example, the polarization modulator may encode the four states of the BB84 protocol, i.e., V (leaving the input state untouched), H (flipping the input state by 180 degrees), D (flipping the input state by 90 degrees) or A (flipping the input state by 270 degrees). The encoded pulses pass through the polarization control, which finely adjusts the polarization based on a feedback from the receiver (Charlie), described later on. The pulses then pass through the intensity control, that finely adjusts the average intensity, in a manner similar to the QKD system described in relation to FIG. 14. To align the average intensity of the optical pulses, a beam splitter directs part of the signal from the channel into the power meter, whose output is used as a feedback signal for the intensity control, which can be implemented using a variable optical attenuator (VOA), as for the QKD setup in FIG. 14. The second transmitter, Bob, has the same components as Alice and also generates the polarisation encoded light pulses.

The optical pulses emitted by the transmitters Alice and Bob travel down the optical channels, which could be optical fibres for example, and reach the interference beam splitter 23 in the receiver. To ensure that the pulses reach the beam splitter 23 at the same time, a fibre stretcher, controlled by the receiver Charlie, is used along the optical channel connecting Bob to the beam splitter 23. When the two pulses overlap on the beam splitter 23 at the same time and their polarization, wavelength and temporal profile are the same, interference will occur, similarly to the QKD case described in relation to FIG. 14.

For the MDI-QKD protocol, the interference is of a Hong-Ou-Mandel type, which is not the same kind of interference occurring in the QKD protocol described in relation to FIG. 14. Contrary to the QKD protocol described in relation to FIG. 14, the electromagnetic phases of the two pulses reaching the beam splitter are randomised, so that the two pulses do not share a mutual stable phase reference. This causes an effect, known as "Hong-Ou-Mandel interference", where the two optical pulses are directed preferably to the same output port of the beam splitter 23. After the beam splitter 23, the pulses are detected in coincidence by the four detectors 24, which are located after two polarizing beam splitters (PBSs) 25. A successful counting is when two out of four detectors simultaneously click. This event is recorded by the LOGIC electronics and used to distil the random key.

While most of the preparations by Alice and Bob are kept secret (they will form the secret key bits), some of them are publicly revealed to Charlie to make it possible to compensate the polarization fluctuations. For example, Alice and Bob may tell Charlie some of their preparations in the V polarization and in the vacuum state. Charlie will check that when V is prepared, only his detectors aligned along V click. If a detector along H clicks, then he will ask Alice and Bob to modify their polarization with the Polarization Control until he the counts in the H detectors go to zero (or are minimised).

To distinguish who should be doing the correction, whether Alice or Bob, Charlie uses the vacuum states declared by the users. For example, if the finds clicks from the H detector when Alice prepared a vacuum state, then Bob should correct his polarization.

The decoy state protocol is implemented in a similar manner to that described in relation to FIG. 14, for example using the three intensity states u, v and w.

The generation of optical pulses with different intensities (and in particular at high-speed) is an important aspect of communication along optical fibres. In some cases intensity may be used to encode information along such fibres, for example using protocols such as Amplitude Modulation (AM), Amplitude-Shift Keying (ASK) and On-Off Keying (OOK).

Enhancing the stability of communications using different intensity level pulses has many applications, for example, decoy-state QKD and decoy-state MDI QKD. Good performance may be achieved for these applications if at least two different intensities can be prepared, two of which are close to each other (i.e. "low-contrast", for example where the second intensity is between ¼th to ¹⁄₂₀th of the first intensity), and it is important to prepare such intensities in a stable manner to mitigate security problems.

While certain arrangements have been described, these arrangements have been presented by way of example only, and are not intended to limit the scope of the inventions. Indeed the methods and systems described herein may be embodied in a variety of other forms; furthermore, various omissions, substitutions and changes in the form of methods and apparatus described herein may be made.

The invention claimed is:

1. A transmitter for a quantum communication system, comprising:
   a photon source unit comprising a photon source; and
   a first intensity modulator, configured to receive an input light pulse from the photon source unit, the first intensity modulator comprising:
      a first element, configured to split the input light pulse into two components,
      a phase modulator, configured to apply a phase shift between the two components, and
      a second element, configured to interfere the two components,
   wherein at least one of the first element and the second element has a splitting ratio less than 1, where the splitting ratio is a ratio of a signal intensity through a first port to a signal intensity through a second port, for a signal applied at a third port, wherein the transmitter is configured to implement decoy state quantum communication, wherein the photon source unit is configured to emit light pulses having a first intensity and a second intensity, the second intensity being lower than the first intensity, wherein the phase modulator comprises a first setting, corresponding to one of destructive interference or constructive interference and a second setting, corresponding to the other of destructive or constructive interference, and wherein the first intensity modulator outputs light pulses having three or more different intensities, dependent on selection between the first and second setting of the phase modulator and the first and second intensity of the photon source unit, wherein a first of the three or more intensities is generated when the photon source unit is configured to emit light pulses having the first intensity and the phase modulator is configured to the first setting, wherein a second of the three or more intensities is generated when the photon source unit is configured to emit light pulses having the first intensity and the phase modulator is configured to the second setting, and wherein a third of the three or more intensities is generated when the photon source unit is configured to emit light pulses having the second intensity.

2. The transmitter according to claim 1, wherein the second intensity corresponds to a vacuum state.

3. The transmitter according to claim 1, wherein the first intensity modulator has an extinction ratio of less than or equal to 0.99.

4. The transmitter according to claim 1, wherein the first intensity modulator has a variable extinction ratio.

5. The transmitter according to claim 1, wherein the first element or the second element comprises an asymmetric beam splitter.

6. The transmitter according to claim 1, wherein the first element or the second element comprises a tunable ratio splitter.

7. The transmitter according to claim 6, wherein the tunable ratio splitter comprises a first symmetric beam splitter and a second symmetric beam splitter, wherein one output of the first symmetric beam splitter is coupled to one input of the second symmetric beam splitter forming a first arm, and the other output of the first symmetric beam splitter is coupled to the other input of the second symmetric beam splitter forming a second arm, wherein at least one of the first arm and the second arm comprises a phase modulator, configured to tune the splitting ratio of the tunable ratio splitter.

8. The transmitter according to claim 1, wherein the first element comprises a polarisation controller and a polarizing beam splitter, configured to split the input light pulse into the two components, the two components having different polarisations.

9. The transmitter according to claim 8, wherein the second element comprises the polarising beam splitter.

10. The transmitter according to claim 1, wherein the first element comprises a first polarisation controller and an interface between a polarization maintaining fibre and a single mode fibre, configured to split the input light pulse into the two components, the two components having different polarisations.

11. The transmitter according to claim 10, wherein the second element comprises the fibre interface, a second polarisation controller and a polarising beam splitter.

12. The transmitter according to claim 1, wherein the photon source unit comprises a pulsed laser, wherein the first intensity corresponds to an "on" state of a gain switched laser and the second intensity corresponds to an "off" state of the laser.

13. The transmitter according to claim 1, wherein the photon source unit comprises a laser and a second intensity modulator, wherein the second intensity modulator is symmetric and wherein the second intensity corresponds to a minimum transmission state of the second intensity modulator.

14. The transmitter according to claim 1, wherein at least one part of the first element also forms at least one part of the second element.

15. The transmitter according to claim 1, wherein the components are integrated onto a photonic chip.

16. A quantum communication system comprising:
the transmitter of claim 1; and
a receiver.

17. The quantum communication system according to claim 16, further comprising a second transmitter.

18. A method of generating intensity modulated photon pulses performed by a transmitter, the method comprising:
generating light pulses at a photon source unit comprising a photon source;
receiving an input light pulse from the photon source unit at a first intensity modulator;
splitting the input light pulses into two components at a first element in the first intensity modulator;
applying a phase shift between the two components at a phase modulator in the first intensity modulator; and
interfering the two components at a second element in the first intensity modulator, wherein at least one of the first element and the second element has a splitting ratio less than 1, where the splitting ratio is the ratio of a signal intensity through a first port to a signal intensity through a second port, for a signal applied at a third port, wherein the transmitter is configured to implement decoy state quantum communication;

wherein the photon source unit is configured to emit light pulses having a first intensity and a second intensity, the second intensity being lower than the first intensity, wherein the phase modulator comprises a first setting, corresponding to one of destructive interference or constructive interference and a second setting, corresponding to the other of destructive or constructive interference, and wherein the first intensity modulator outputs light pulses having three or more different intensities, dependent on selection between the first and second setting of the phase modulator and the first and second intensity of the photon source unit, wherein a first of the three or more intensities is generated when the photon source unit is configured to emit light pulses having the first intensity and the phase modulator is configured to the first setting, wherein a second of the three or more intensities is generated when the photon source unit is configured to emit light pulses having the first intensity and the phase modulator is configured to the second setting, and wherein a third of the three or more intensities is generated when the photon source unit is configured to emit light pulses having the second intensity.

* * * * *